United States Patent
Reed et al.

(10) Patent No.: US 12,137,029 B2
(45) Date of Patent: Nov. 5, 2024

(54) DYNAMIC RECONFIGURATION OF RESILIENT LOGICAL MODULES IN A SOFTWARE DEFINED SERVER

(71) Applicant: Hewlett Packard Enterprise Development LP, Spring, TX (US)

(72) Inventors: David P. Reed, Needham, MA (US); Isaac R. Nassi, Los Gatos, CA (US); Gary Smerdon, Saratoga, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/170,881

(22) Filed: Feb. 17, 2023

(65) Prior Publication Data

US 2023/0254205 A1     Aug. 10, 2023

Related U.S. Application Data

(63) Continuation of application No. 17/320,629, filed on May 14, 2021, now Pat. No. 11,627,041, which is a
(Continued)

(51) Int. Cl.
| | |
|---|---|
| *H04L 41/082* | (2022.01) |
| *G06F 9/50* | (2006.01) |
| *H04L 41/0659* | (2022.01) |
| *H04L 41/0668* | (2022.01) |
| *H04L 43/0817* | (2022.01) |
| *H04L 43/16* | (2022.01) |

(52) U.S. Cl.
CPC .......... *H04L 41/082* (2013.01); *G06F 9/5077* (2013.01); *H04L 41/0659* (2013.01); *H04L 41/0668* (2013.01); *H04L 43/0817* (2013.01); *H04L 43/16* (2013.01)

(58) Field of Classification Search
CPC ............... H04L 41/082; H04L 41/0659; H04L 43/0817; H04L 43/16; G06F 9/5077
See application file for complete search history.

(56) References Cited

U.S. PATENT DOCUMENTS

| | | |
|---|---|---|
| 5,109,486 A | 4/1992 | Seymour |
| 7,146,521 B1 | 12/2006 | Nguyen |

(Continued)

OTHER PUBLICATIONS

International Search Report and Written Opinion received for PCT Patent Application No. PCT/US2018/060679, mailed on Jan. 24, 2019, 10 pages.
(Continued)

*Primary Examiner* — Andrew C Georgandellis
(74) *Attorney, Agent, or Firm* — Yao Legal Services, Inc.

(57) ABSTRACT

Dynamic adaptive reconfiguration of a computing system includes receiving a request to remove a first node in a plurality of physical nodes. An operating system is executing collectively across the plurality of physical nodes, and an application is running on the operating system. It further includes in response to the request, and while the application is running, evacuating virtualized resources associated with the first node to one or more other nodes in the plurality of physical nodes. It further includes subsequent to the evacuation of the virtualized resources, removing the first node from the plurality of physical nodes.

9 Claims, 15 Drawing Sheets

Related U.S. Application Data continuation of application No. 16/186,332, filed on Nov. 9, 2018, now Pat. No. 11,050,620.

(60) Provisional application No. 62/586,049, filed on Nov. 14, 2017.

(56) References Cited

U.S. PATENT DOCUMENTS

| | | | |
|---|---|---|---|
| 8,407,445 | B1 | 3/2013 | Pathak et al. |
| 8,473,566 | B1 | 6/2013 | Cardente et al. |
| 8,769,226 | B2 | 7/2014 | Wilk |
| 8,776,050 | B2 | 7/2014 | Plouffe et al. |
| 9,130,943 | B1 | 9/2015 | Giardina et al. |
| 9,280,375 | B1 | 3/2016 | Youseff et al. |
| 9,378,067 | B1 | 6/2016 | Agarwala et al. |
| 2005/0120160 | A1* | 6/2005 | Plouffe ............... G06F 9/505 711/1 |
| 2006/0155912 | A1 | 7/2006 | Singh et al. |
| 2016/0306675 | A1 | 10/2016 | Wiggers et al. |
| 2019/0361728 | A1 | 11/2019 | Kumar et al. |

OTHER PUBLICATIONS

Kronenberg et al. VAXclusters: A Closely-Coupled Distributed System. Digital Equipment Corporation. ACM Transactions on Computer Systems, vol. 4, No. 2, May 1986, pp. 130-146.

Roger R. Schell. Dynamic Reconfiguration in a Modular Computer System. Project MAC, Massachusetts Institute of Technology. Jun. 1971.

Vasilevsky et al. Linux(R) Virtualization on Virtual Iron(TM) VFe. Virtial Iron Software, Inc. Proceedings of the Linux Symposium. vol. Two. Jul. 20-23, 2005.

* cited by examiner

DYNAMIC RECONFIGURATION OF RESILIENT LOGICAL MODULES IN A SOFTWARE DEFINED SERVER

CROSS REFERENCE TO OTHER APPLICATIONS

This application is a continuation of U.S. patent application Ser. No. 16/186,332, entitled DYNAMIC RECONFIGURATION OF RESILIENT LOGICAL MODULES IN A SOFTWARE DEFINED SERVER filed Nov. 9, 2018 which is incorporated herein by reference for all purposes, which claims priority to U.S. Provisional Patent Application No. 62/586,049 entitled DYNAMIC RECONFIGURATION OF RESILIENT LOGICAL MODULES IN A SOFTWARE DEFINED SERVER filed Nov. 14, 2017 which is incorporated herein by reference for all purposes.

BACKGROUND OF THE INVENTION

In existing data centers, changes in system hardware may result in downtime of the data center. This adversely impacts and disrupts applications that are running on the data centers, which have to be stopped. It would be beneficial if such disruptions could be minimized.

BRIEF DESCRIPTION OF THE DRAWINGS

Various embodiments of the invention are disclosed in the following detailed description and the accompanying drawings.

DETAILED DESCRIPTION

Figure 1:
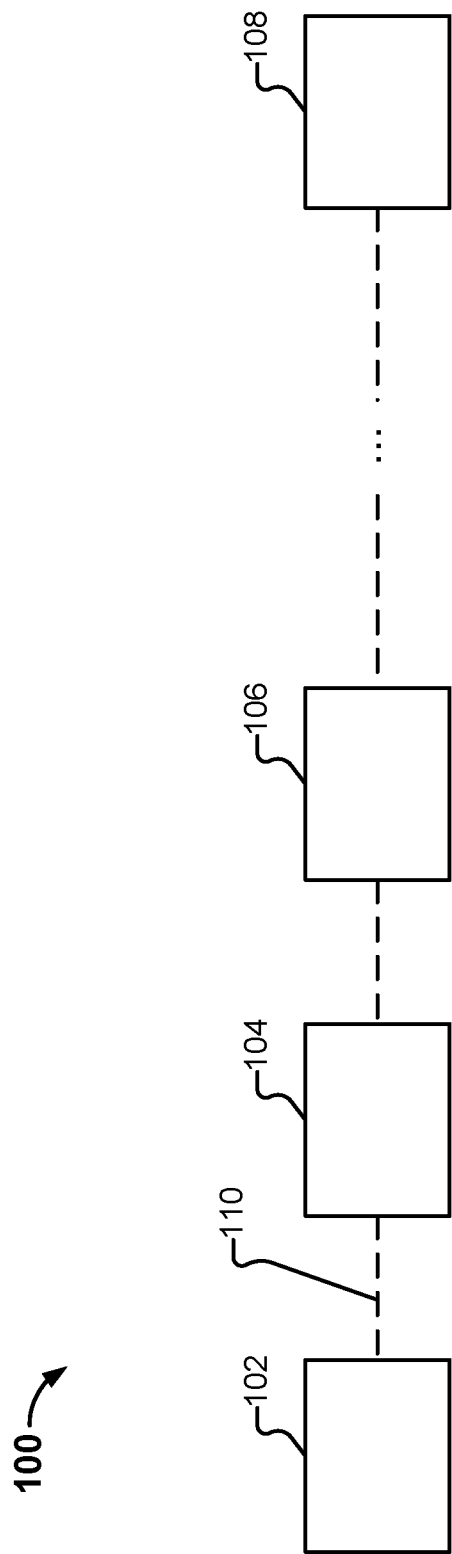
FIG. 1 illustrates an embodiment of a computer system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In existing data center solutions, modifying or otherwise making changes to the underlying hardware (e.g., adding/removing resources) may be problematic, thus making it challenging to handle failures or to provide scalable computing.

For example, consider distributed multi-server architectures such as Amazon AWS and Google Cloud. In such architectures, reliability/failure mechanisms are implemented at the application level. Thus, for example, in order to manage failures, a server is crashed, and the part of the application that had been running on the server is moved onto another server. This, however, requires redesigning of the application itself, which may not be desirable.

Similarly, when scaling up or down physical resources provided, for example, to virtual machines that are running on the data center, typically, the entire virtual machine must be moved from one piece of hardware to another piece of hardware entirely. The process of moving the virtual machine from one server to another is resource intensive and disruptive. For example, the movement may include copying all of the pages of the virtual machine while the virtual machine is running on a node. After the pages are copied, the virtual machine is stopped, resulting in a disruption to any applications that are running. The state of the processors and other components of the virtual machine are transferred over when moving the virtual machine from one server to another.

Other existing systems have attempted to allow for reconfiguration of resources in a distributed multi-server architecture, but require specialized hardware and software.

Described herein are techniques for dynamic reconfiguration of a multi-server distributed computing architecture. One example of a multi-server distributed computing architecture is a software defined server, which will be described in further detail below. While example embodiments of dynamic reconfiguration of a software defined server are described below for illustrative purposes, the dynamic reconfiguration techniques described herein may be variously adapted to accommodate any other type of multi-server distributed architecture, as appropriate.

A dynamically reconfigurable software defined server, as described herein, which when utilized in a data center context, addresses the aforementioned issues. For example, using the techniques described herein, the resources of a distributed multi-server architecture may be reconfigured while an operating system running across the multi-server architecture continues to run, without having to be rebooted, and without any disruption to a running application.

As will be described in further detail below, as compared to existing systems such as those described above, rather than reliability failover mechanisms being implemented at the application level, using the techniques described herein, such failover mechanisms need not be programmed within the application and are instead handled by the underlying/supporting computing platform.

Examples of performing reconfiguration due to handling of physical componentry faults, as well as on-demand provisioning of physical resources to meet the needs of an application are described in further detail below.

As one example benefit of the techniques described herein, the ability to reconfigure underlying hardware while allowing an application to continue to run allows mission critical applications, such as databases, traffic control, and travel reservation systems to be continuously available and able to quickly respond to requests.

Software Defined Server Overview

As used herein, a software defined server refers to an assembly or collection or cluster of hardware modules (e.g., computing nodes or individual computers) that run a distributed virtual machine manager referred to herein as a "hyper-kernel."

Compared to existing distributed multi-server architectures, on which a single physical node or server supports many virtual machines, in a software defined server, a single virtual machine that spans many physical nodes/servers is supported.

Details regarding an example implementation of a software defined server are described below.

FIG. 1 illustrates an embodiment of a computer system. System 100 is also referred to herein as a "software-defined server," an "enterprise supercomputer," and a "mainframe." In the example shown, system 100 includes a plurality of nodes (e.g., nodes 102-108) located in close proximity (e.g., located within the same rack or nearby racks of servers). In other embodiments, multiple racks of nodes (e.g., located within the same facility) can be used in the system. Further, the techniques described herein can also be used in conjunction with distributed systems.

The nodes are interconnected with an interconnect (110) such as 10-gigabit or 40-gigabit Ethernet, direct PCI-to-PCI, and/or InfiniBand. Each node comprises commodity server-class hardware components (e.g., a blade in a rack with its attached or contained peripherals). The interconnect may be dedicated, but need not be. The interconnect may also be high-speed, but need not be. In the example shown in FIG. 1, each node includes multiple physical processor chips. Each physical processor chip (also referred to as a "socket") includes multiple cores, and each core has multiple hyper-threads.

Figure 2:
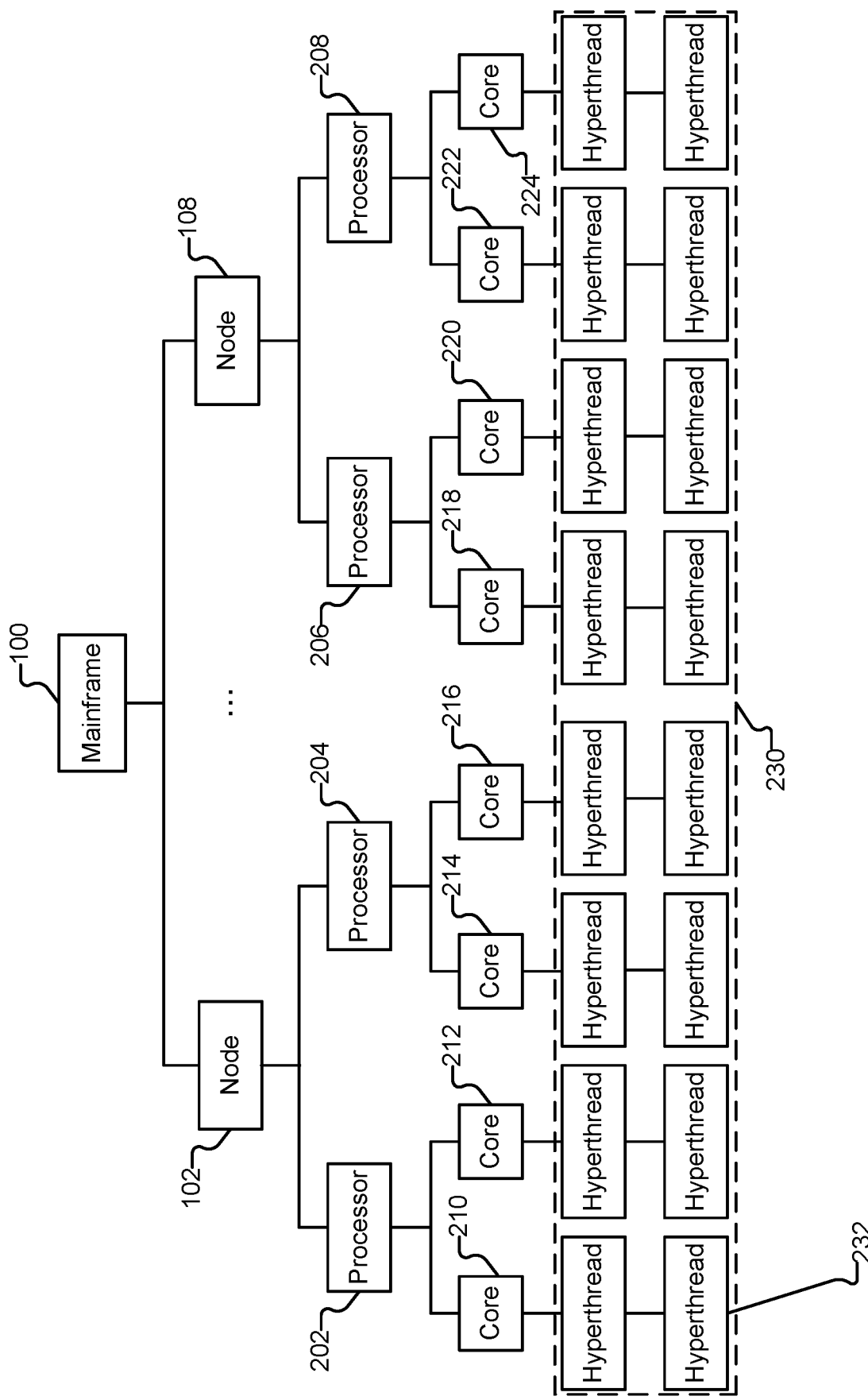
FIG. 2 illustrates the physical structure of the computer system as a hierarchy.

As illustrated in FIG. 2, the physical structure of system 100 forms a hierarchy (230) (from the bottom) of hyper-threads (232), cores (210-224), physical processor chips (202-208), and nodes (102-108 (with nodes 104, 106, etc. omitted from the figure and represented as ellipses)). The tree depicted in FIG. 2 is of a fixed size, defined by the hardware configuration.

As will be described in more detail below, each enterprise supercomputer (e.g., system 100) runs a single instance of an operating system. Both the operating system, and any applications, can be standard commercially available software and can run on system 100. In the examples described herein, the operating system is Linux, however other operating systems can also be used, such as Microsoft Windows, Mac OS X, or FreeBSD.

Figure 3A:
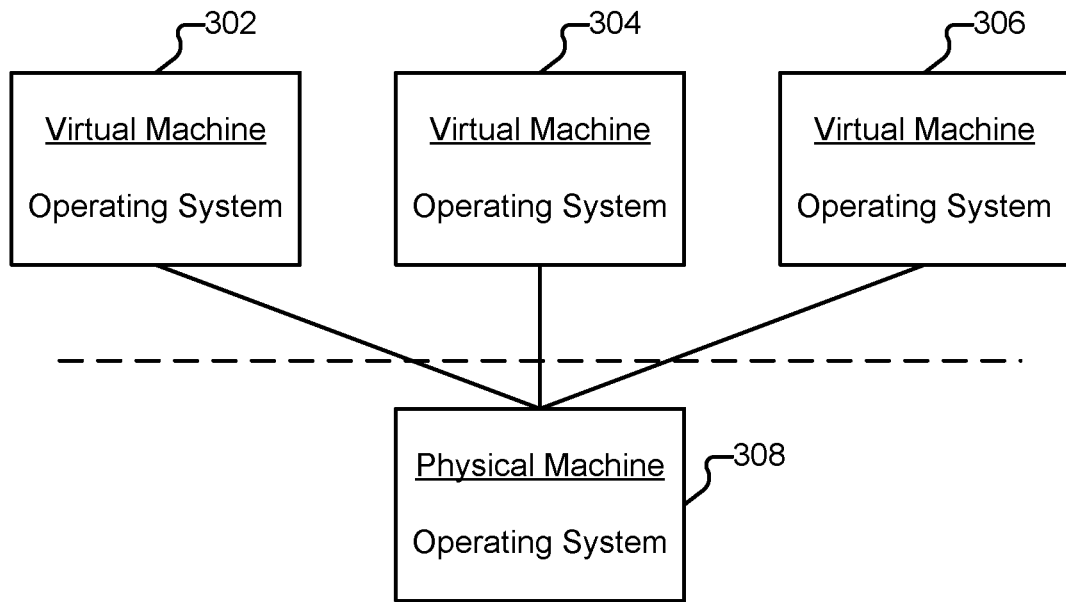
FIG. 3A depicts a virtualized computing environment in which multiple virtual machines (with respective multiple guest operating systems) run on a single physical machine.
Figure 3B:
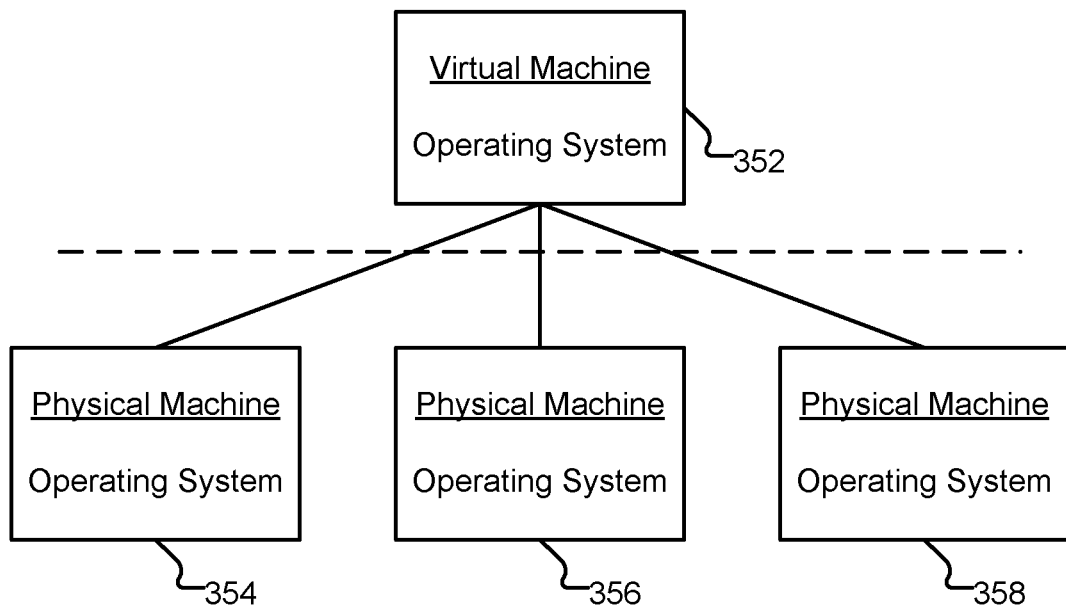
FIG. 3B depicts a virtualized computing environment in which multiple physical machines collectively run a single virtual operating system.

In a traditional virtualized computing environment, multiple virtual machines may run on a single physical machine. This scenario is depicted in FIG. 3A. In particular, three virtual machines (302-306) are running three guest operating systems on a single physical machine (308), which has its own host operating system. In contrast, using the techniques described herein, multiple physical machines (354-358) collectively run a single virtual operating system (352), as depicted in FIG. 3B.

Figure 4A:
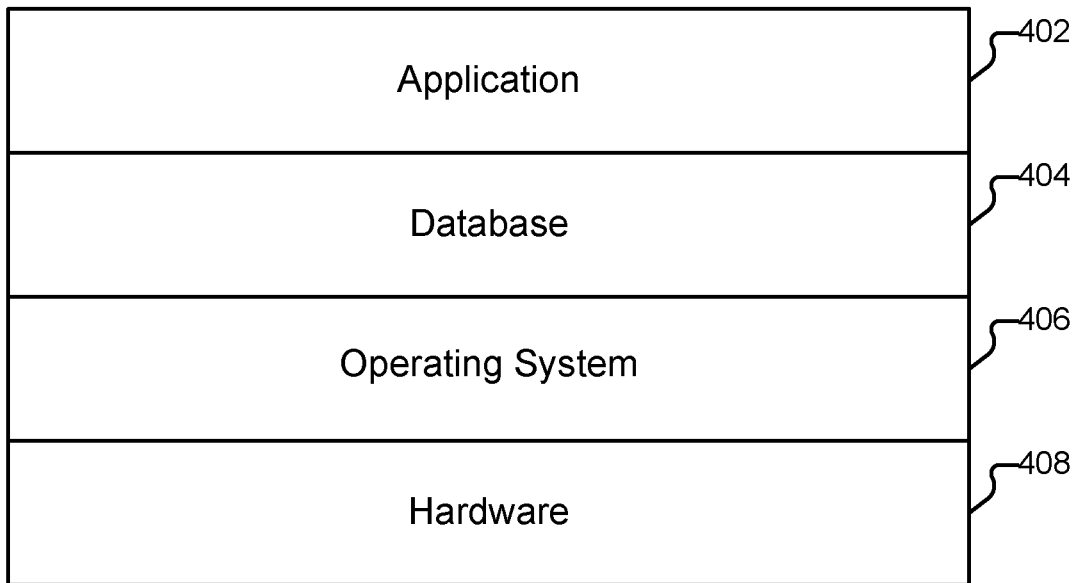
FIG. 4A depicts an example of a software stack.
Figure 4B:
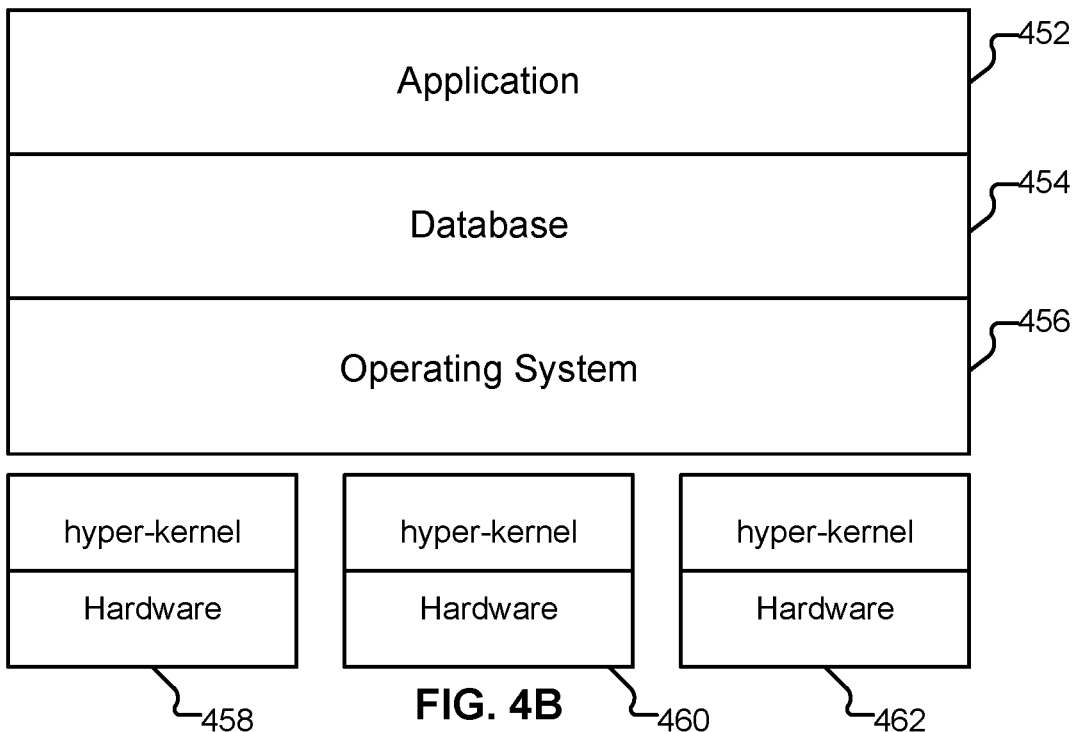
FIG. 4B depicts an example of a software stack.

One example of a software stack is depicted in FIG. 4A. Such a stack may typically be used in traditional computing environments. In the stack shown in FIG. 4A, an application (402) sits above a database engine (404), which in turn sits upon an operating system (406), underneath which lies hardware (408). FIG. 4B depicts a software stack used in some embodiments. As with the stack shown in FIG. 4A, an application (452) sits above a database engine (454), which in turn sits upon an operating system (456). However, underneath the operating system and above the hardware is a layer of software (referred to herein as a hyper-kernel) that observes the system running in real time and optimizes the system resources to match the needs of the system as it operates. The hyper-kernel (one example of a virtual machine manager) conceptually unifies the RAM, processors, and I/O (Input Output resources for example Storage, Networking resources) of a set of commodity servers, and presents that unified set to the operating system. Because of this abstraction, the operating system will have the view of a single large computer, containing an aggregated set of processors, memory, and I/O. As will be described in more detail below, the hyper-kernel optimizes use of resources. The hyper-kernel can also help optimize other I/O system resources such as networks and storage. In some embodiments, based on observations and profiles of running software, performance indicators (hints) are provided to upper layers (e.g., database management systems) about the dynamic performance of the system that can further improve overall system performance.

The hyper-kernel can be ported to all major microprocessors, memory, interconnect, persistent storage, and networking architectures. Further, as hardware technology evolves (e.g., with new processors, new memory technology, new interconnects, and so forth), the hyper-kernel can be modified as needed to take advantage of industry evolution.

As shown in FIG. 4B, operating system 456 is running collectively across a series of nodes (458-462), each of which has a hyper-kernel running on server hardware.

Specifically, the operating system is running on a virtual environment that is defined by the collection of hyper-kernels. As will be described in more detail below, the view for operating system 456 is that it is running on a single hardware platform that includes all of the hardware resources of the individual nodes 458-462. Thus, if each of the nodes includes 1 TB of RAM, the operating system will have as a view that it is running on a hardware platform that includes 3 TB of RAM. Other resources, such as processing power, and I/O resources can similarly be collectively made available to the operating system's view.

Figure 5:
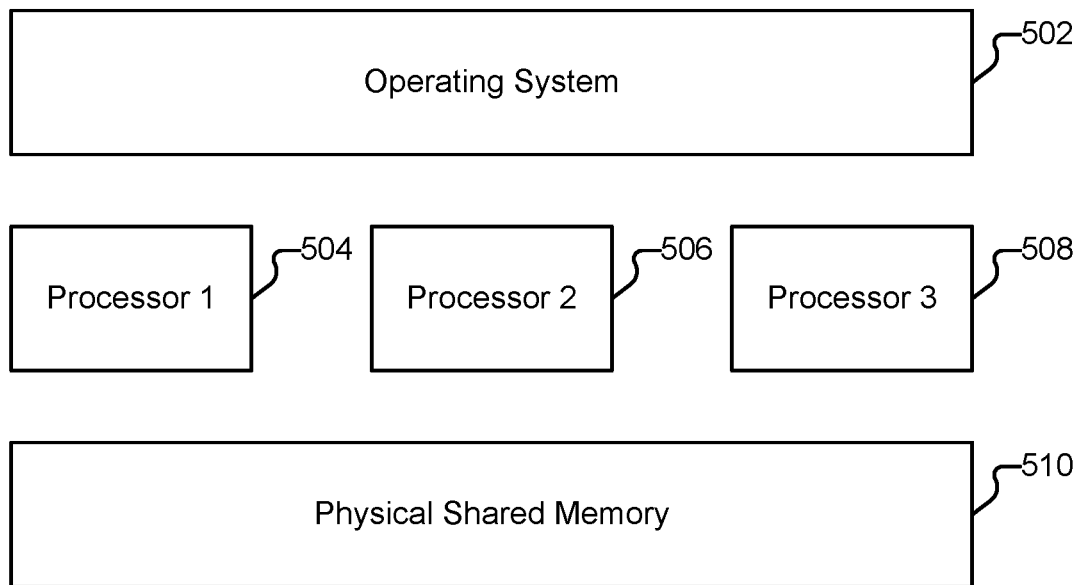
FIG. 5 depicts an example of an operating system's view of hardware on an example system.

FIG. 5 depicts an example of an operating system's view of hardware on an example system. Specifically, operating system (502) runs on top of processors 504-508 and physical shared memory 510. As explained above, an operating system can run on either a traditional computing system or on an enterprise supercomputer such as is shown in FIG. 1. In either case, the view of the operating system will be that it has access to processors 504-508 and physical shared memory 510.

Figure 6A:
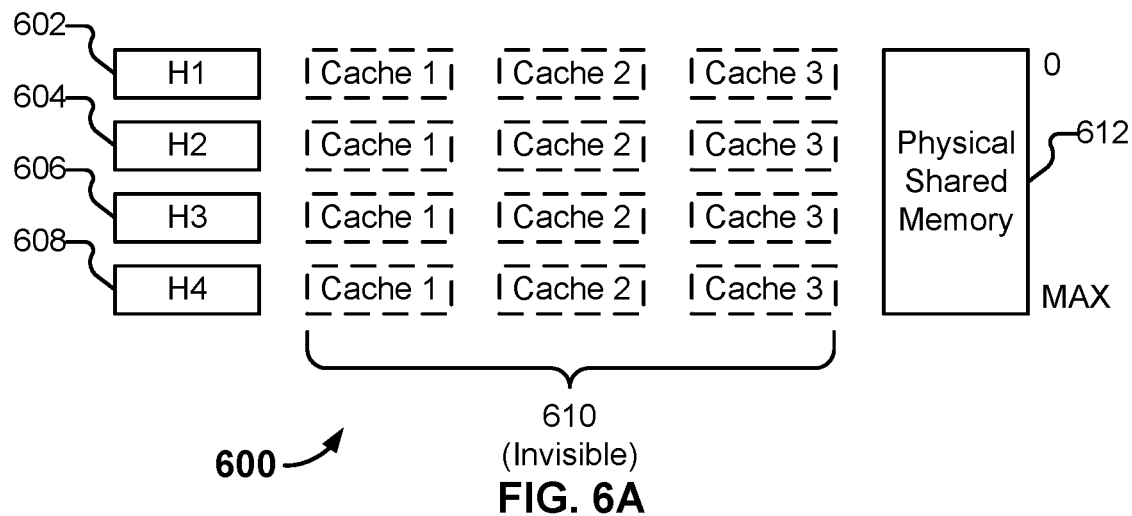
FIG. 6A depicts an example of a hyperthread's view of hardware on a single node.

FIG. 6A depicts an example of a hyperthread's view of hardware on a single node. In this example, a node has four hyperthreads denoted H1 (602) through H4 (608). Each hyperthread can access all portions of physical shared memory 612. Physical shared memory 612 is linear, labeled location 0 through a maximum amount, "max." The node also includes three levels of cache (610).

Figure 6B:
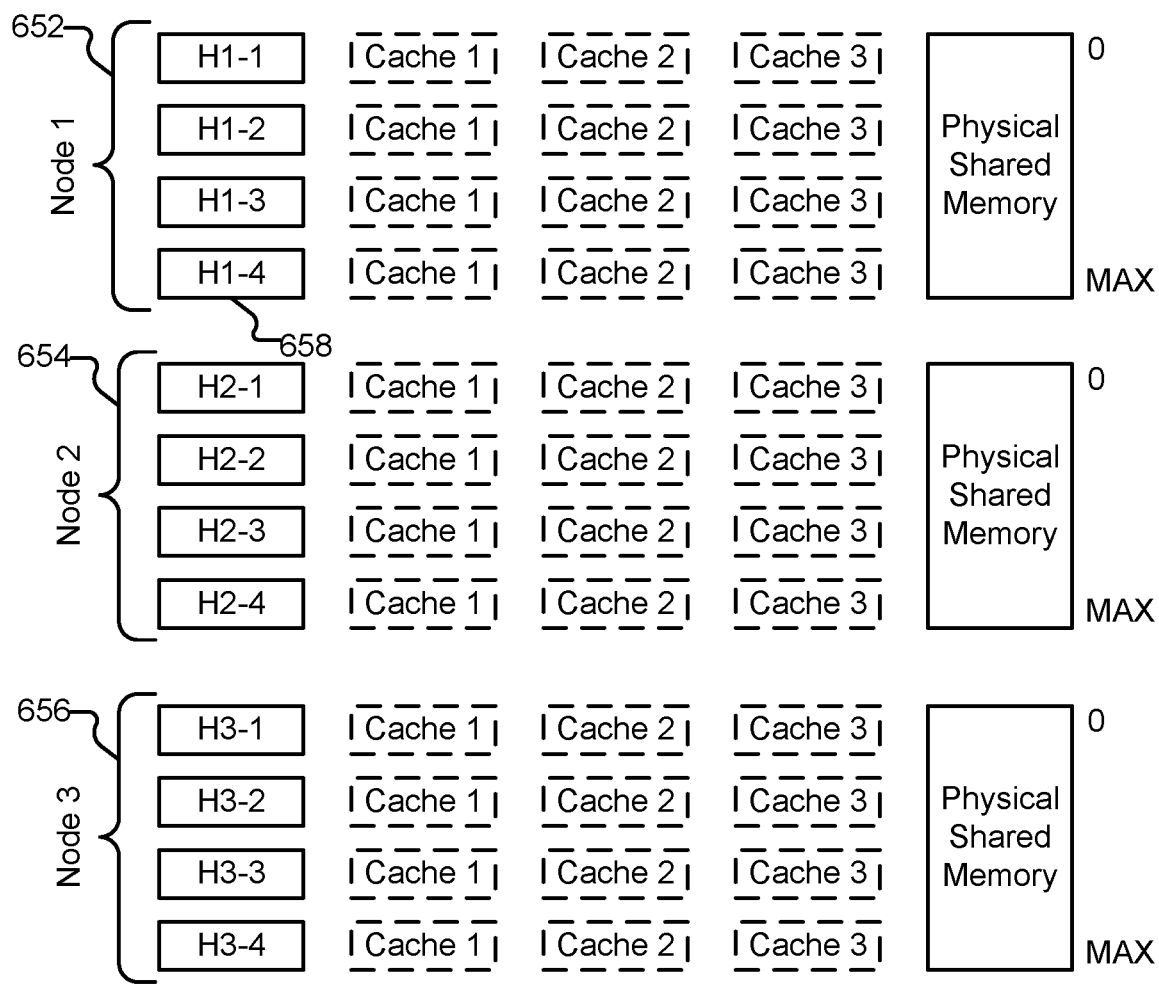
FIG. 6B depicts an example of a hyper-kernel's view of hardware on an example system.

FIG. 6B depicts an example of a hyper-kernel's view of hardware on an example system. In this example, three nodes (652-656) are included in an enterprise supercomputer. Each of the three nodes has four hyperthreads, a physical shared memory, and cache (i.e., each node is an embodiment of node 600 shown in FIG. 6A). A hyperthread on a given node (e.g., node 652) has a view that is the same as that shown in FIG. 6A. However, the hyper-kernel is aware of all of the resources on all of the nodes (i.e., the hyper-kernel sees twelve hyperthreads, and all of the physical shared memory). In the example shown in FIG. 6B, a given hyperthread (e.g., hyperthread 658, "H1-4") is labeled with its node number (e.g., "1") followed by a hyperthread number (e.g., "4").

Figure 7:
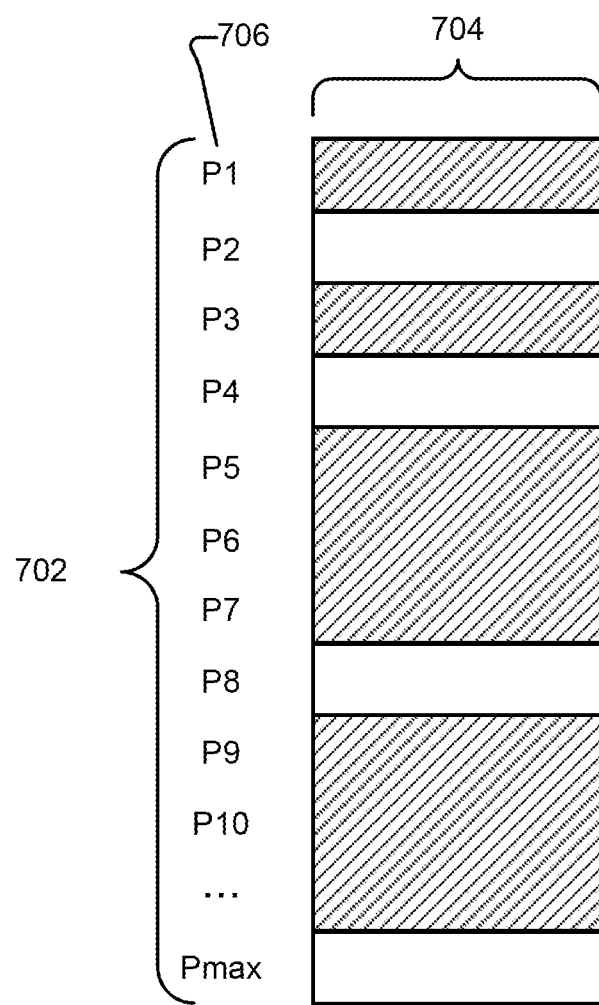
FIG. 7 depicts an example of an operating system's view of hardware on an example of an enterprise supercomputer system.

FIG. 7 depicts an example of an operating system's view of hardware on an example of an enterprise supercomputer system. The operating system sees a plurality of "virtualized processors" (also referred to herein as "virtual processors" and "VCPUs") denoted in FIG. 7 as P1 through Pmax (702). The virtualized processors correspond to the total number of hyperthreads across all nodes included in the enterprise supercomputer. Thus, using the example of FIG. 6B, if a total of twelve hyperthreads are present across three nodes, a total of twelve virtualized processors would be visible to an operating system running on the enterprise supercomputer. The operating system also sees "virtualized physical memory" (704) that appears to be a large, physical, linear memory of a size equal to the total amount of physical memory across all nodes.

As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state. As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state.

Resource Virtualization

Memory Virtualization

As explained above, in the physical configuration, each node has an array of memory addresses representing locations in memory. As such, in a physical configuration with three nodes (e.g., as depicted in FIG. 6B), there are three memory locations each of which has address 0x123456. In contrast, in the virtual configuration, all memory addresses are unique and represent the sum total of all memory contained in those three nodes. In the virtual configuration, all memory is shared, and all memory caches are coherent. In some embodiments, memory is further subdivided into a series of contiguous blocks, with monotonically increasing memory addresses. In the examples described herein, each page has 4K bytes of memory, however, other subdivisions can also be used, as applicable. The term "blocks" is used herein to describe contiguous arrays of memory locations. In some embodiments, the "blocks" are "pages."

Processor Virtualization

A virtual processor (e.g., virtual processor 706 of FIG. 7), as seen by the operating system, is implemented on a hyperthread in the physical configuration, but can be location independent. Thus, while the operating system thinks it has 500 processors running on a single physical server, in actuality it might have 5 nodes of 100 processors each. (Or, as is shown in FIG. 6B, the operating system will think it has twelve processors running on a single physical server.) The computation running on a virtual processor is described either by the physical configuration on a hyperthread when the computation is running, or in a "continuation," when the virtual processor is not running (i.e., the state of an interrupted or stalled computation).

As used herein, a "continuation" represents the state of a virtual processor. Each continuation:

- Has processor state (i.e., saved registers, etc.).
- Has a set of performance indicators that guide a scheduler object with information about how to intelligently assign continuations to leaf nodes (e.g., hyperthreads) for execution.
- Has a virtual-processor identifier that indicates the processor the operating system thinks is the physical processor to which this continuation is assigned.
- Has an event on which this continuation is waiting (possibly empty).
- Has a state which includes: "waiting-for-event" or "ready."

I/O Virtualization

I/O systems observe a similar paradigm to processors and memory. Devices have a physical address in the physical configuration and virtual addresses in the virtual configuration. When migrating computations (described in more detail below), if for example, there are memory buffers associated with I/O operations, the I/O devices used will likely perform better if they are co-located with the memory with which they are associated, and can be moved accordingly.

Resource Maps

Resource maps are used to translate between virtual and physical configurations. The following are three types of resource maps used by enterprise supercomputers in various embodiments.

A "physical resource map" is a table that describes the physical resources that are available on each node. It contains, for example, the number and type of the processors on each node, the devices, the memory available and its range of physical addresses, etc. In some embodiments, this table is read-only and is fixed at boot time.

An "initial virtual resource map" is fixed prior to the booting of the operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of the Ethernet controller eth27 in the virtualized machine may at different times refer to different hardware controllers. The current resource map is used by the hyper-kernel to dynamically modify the virtual hardware resource mappings, such as the virtual memory subsystem, as required.

Resource Migration Overview

Using the techniques described herein, virtualized resources, such as virtual general-purpose processors, virtual memory, virtual networks, and virtual disks can be migrated between physical locations. Virtual interrupts may also be remotely delivered. As explained above, the operating system is provided with information about the virtualized system, but that information need not agree with the physical system. As long as the basic hardware abstractions expected by the operating system are not violated, a virtual machine may look to the operating system just like a physical machine.

As described above, in the example software-defined server described herein, there is an identical instance of the hyper-kernel running on each node of the cluster that the virtual machine spans.

Due to physical hardware boundaries, a physical processor cannot directly address every guest physical address. When a guest physical address needs to be read or written, it is translated into a physical address that the physical processor can access.

In one embodiment, this is handled through the physical processor's second level page tables. When software makes a reference to a guest (virtual) physical address, if the page of memory containing that address is resident on the node that has the processor that generated that address, the address is represented in the second level page table. Automatic address translation hardware will then translate that address to a guest physical address and then to a real physical address as it normally does by using the first and second level page tables, with no performance degradation. However, if the memory address is not present in the second level page table, the hardware cannot completely translate that guest address to a real physical address, and the processor generates an interrupt. The hyper-kernel fields that interrupt and analyzes the request (similar to what an operating system might do when it needs to copy a page that is not memory-resident but is only resident on a backing store). This analysis may result in a request for that page to be sent (migrated) to the node from a different node, or it may result in a decision to migrate that virtual processor to the node that has that page of memory. Page reads and writes may be handled differently. For example, readable pages may be replicated, but a writable page requires additional overhead to remove that page from the L4 cache of other nodes that may have a copy (i.e., invalidation).

In one embodiment, to migrate a virtual processor, the hyper-kernel takes a snapshot of the state of the processor (e.g., a continuation, using 6400 bytes of data, or any other amount as appropriate) and sends it in a message over the dedicated interconnect (e.g., Ethernet) to the chosen destination, where the suspended virtual processor may be restored onto another physical processor (e.g., implemented as a hyperthread of a processor core) at the destination node. Saving and restoring processor state may be implemented using mechanisms provided for processors supporting virtualization. Since the program counter has not advanced, the instruction is then restarted. Since the page and the virtual processor are now co-resident, the virtual processor continues running. It is possible that in some cases the instruction generates additional interrupts to access different non-resident pages, but the mechanism that is used may be the same. When the virtual processor migrates, its updated location is recorded (e.g., in the resource maps described above). However, for reliability, perfect location knowledge is not assumed, as the virtual processor may have subsequently re-migrated.

In the following example of resource migration, suppose an enterprise supercomputer holds a large in-memory database, larger than can fit into a single node. Part of the database is in a first node, "node1." Suppose one of the cores on a different node, "node2," is trying to access data that is owned by node1 and that does not reside locally in a cache on node2. The core on node2 will receive a memory access violation because it is trying to access data that it believes it should be able to access (but cannot). As will be described in more detail below, the exception is handled in the hyper-kernel.

One way that the situation can be resolved is by moving the needed area of memory to node2, and then returning control back to the operating system (which, in turn, returns it back to the database system). The software can then proceed as intended (i.e., as if the access violation never occurred).

In many cases, there may be one or more other cores in other nodes (e.g., "node3") that are also trying to access the same area block of memory as needed by node2 above. Node3 might be attempting to access the same data, or it might be accessing different data contained in the memory that was moved (also referred to as "false sharing"). The data could be moved to node3, but if the core on node2 asks for the data a second time, the data would need to be moved back to node2 (i.e., potentially moving the data back and forth repeatedly), which can be slow and wasteful. One way to avoid moving data back and forth between cores is to recognize that both cores and the associated block of data should be co-located. Using the techniques described herein, the memory and the computation can be migrated so that they reside on the same node. Doing so will result in a higher likelihood of faster access to data, and a higher probability of sharing data stored in local caches.

When the access violation occurs, an event is triggered (in a system dependent way) to which the hyper-kernel responds. One example of how such an event can be handled is by the invocation of a panic routine. Other approaches can also be used, as applicable. As will be described in more detail below, the hyper-kernel examines the cause of the event and determines an appropriate strategy (e.g., low level transaction) for handling the event. As explained above, one way to handle the event is for one or more blocks of hyper-kernel virtualized memory to be transferred from one node's memory to another node's memory. The transfer would then be initiated, and the corresponding resource maps would be updated. A continuation would be built poised to be placed in a local table in shared memory, referred to herein as an "event table," so that the next thing the continuation does when it is resumed would be to return control to the operating system after the transfer is completed. Alternatively, a decision could be made to move the virtual processor to the node that contains the memory being requested or to move the virtualized memory (and its virtualized memory address) from one node to another. Different decisions for how to handle the stall may be based on the characteristics or context or cause of the stalling event. In various embodiments, the hyper-kernel makes three decisions when handling an event: which (virtual) resources should move, when to move them, and to where (in terms of physical locations) they should move.

Tidal Tree

The physical hierarchical structure depicted in FIG. 2 has an analogous software hierarchy comprising a set of "scheduler objects" (i.e., data structures), each of which has a set of characteristics described below. The scheduler objects form a "TidalTree," which is an in-memory tree data structure in which each node of the tree is a scheduler object. Each scheduler object corresponds to an element of the physical structure of the supercomputer (but not necessarily vice versa), so there is one node for the entire machine (e.g., node 100 as shown in FIG. 2), one node for each physical node of the system (e.g., node 102 as shown in FIG. 2), one node for each multicore socket on the physical nodes that comprise the entire machine (e.g., node 202 as shown in FIG. 2), one node for each core of each socket (e.g., node 210 as shown in FIG. 2), and one node for each hyperthread on that core (e.g., node 232 as shown in FIG. 2).

Each scheduler object s:
Is associated with a physical component (e.g., rack, blade, socket, core, hyperthread).
Except for the root of the tree, has a parent scheduler object which is partly responsible for directing its operations (as explained in more detail below).
Has a set of children each of which is a scheduler object. This is the null set for a leaf (e.g., hyperthread) node. As explained in more detail below, it is the responsibility of a scheduler object s to manage and assign (or re-assign) work to its children, and indirectly to its grandchildren, etc. (i.e., s manages all nodes in the subtree rooted at s).
Has a work queue, which is a set of continuations (as described earlier).
Has a (possibly empty) set of I/O devices that it also has the responsibility to manage and assign (or re-assign) work.

Each node can potentially be associated with a layer of some form of cache memory. Cache hierarchy follows the hierarchy of the tree in the sense that the higher the scheduler object is, the slower it will usually be for computations to efficiently utilize caches at the corresponding level of hierarchy. The cache of a scheduler object corresponding to a physical node can be a cache of memory corresponding to that node. The memory on the physical node can be thought of as a cache of the memory of the virtual machine.

Resource Migration—Additional Information

The hyper-kernel simulates part of the virtual hardware on which the virtual configuration resides. It is an event-driven architecture, fielding not only translated physical hardware events, but soft events, such as receipt of inter-node hyper-kernel messages generated by hyper-kernel code running on other nodes.

As explained above, when an interrupt event significant to the hyper-kernel occurs, the hyper-kernel makes a decision of how to respond to the interrupt. Before control is returned to the operating system, any higher priority interrupts are recognized and appropriate actions are taken. Also as explained above, the hyper-kernel can make three separate decisions: (1) which resources to migrate upon certain events, (2) when to migrate them, and (3) to where those resources should move.

In the following example, suppose a scheduler object "s" in a virtual machine is in steady state. Each scheduler object corresponding to a physical node has a set of physical processor sockets assigned to it. Hyperthreads in these sockets may or may not be busy. The physical node also has some fixed amount of main memory and a set of I/O devices, including some network devices. Scheduler object s, when corresponding to a node, is also responsible for managing the networks and other I/O devices assigned to nodes in the subtree rooted at s. The following is a description of how resources can migrate upon either synchronous or asynchronous events.

Migrations Triggered by Synchronous Events

In the following example, suppose there exists a leaf node scheduler object s, and virtual processor p assigned to s. Leaf node schedule object s is assumed to be executing an application or operating system code on behalf of an application. Assuming the leaf node is not in an infinite loop, p will eventually run out of work to do (i.e., stall) for some reason (e.g., waiting for completion of an I/O operation, page fault, etc.). Instead of allowing p to actually stall, the hyper-kernel decides whether to move the information about the stalled computation to some other node, making one of that other node's processors "responsible" for the stalled computation, or to keep the "responsibility" of the stalled computation on the node and instead move the relevant resources to the current node.

The stall is thus handled in either of two ways: either the computation is moved to the physical node that currently has the resource, or else the resource is moved to the physical node that has requested the resource. Example pseudo code for the handling of a stall is provided below (as the "OnStall" routine) in the "EXAMPLE ROUTINES" section below.

Decisions such as how to handle a stall can be dependent on many things, such as the order of arrival of events, the state of the computation running on the virtual machine, the state of the caches, the load on the system or node, and many other things. Decisions are made dynamically, i.e., based on the best information available at any given point in time.

Recording Stalled Computations

Stalled computations are recorded in a data structure referred to as a "continuation." A continuation has a status that can be, for example, "waiting-for-event" or "ready." A stalled computation gets recorded as a newly created continuation with status "waiting-for-event." Once the reason for stalling is satisfied (e.g., due to detection of the event), the status of the corresponding continuation is changed to "ready." Each continuation with status "ready" is stored in a "wait queue" of a scheduler object so that eventually it gets scheduled for execution. In contrast, any continuation with status "waiting-for-event" will not be stored in any scheduler object's wait queue. Instead, it is stored in the local shared memory of the physical node where the hardware event that stalled the corresponding computation is expected to occur, such as receipt of a missing resource.

Additionally, the newly created continuation is associated with the stalling event that caused its creation. This mapping between (stalling) events and continuations awaiting these events permits fast dispatch of asynchronous events (see the "handleEvent" described below). The mapping between continuations and events is stored in a table called "event table" and is kept in the shared memory of the corresponding physical node. Each physical node has its own event table, and an event table of a physical node is directly addressable by every core on that physical node. All anticipated events recorded in an event table of a physical node correspond to hardware events that can occur on that physical node. The scheduler object s mapped to a physical node n represents n, and the event table of n is associated with s. In some cases, several continuations may be waiting on the same event, and so some disambiguation may be required when the event is triggered.

Continuations are built using the "InitContinuation" routine. If a decision is made to move the computation, the remote physical node holding the resource will build a continuation that corresponds to the stalled computation and will store it in the remote physical node's event table. When that continuation resumes, the resource will be available. In effect, the hyper-kernel has transferred the virtual processor to a different node.

In the case where a decision is made to move the resource, the node that has experienced the stall requests the transfer of the resource and builds a continuation using InitContinuation and stores it in the local event table. Upon receipt of the resource, the continuation is attached to an appropriate node in the TidalTree, and when that continuation is resumed, the resource will be generally be available and visible. In effect, the virtual resource has been transferred to the node that requested it.

Note that by placing continuations in event tables, it is guaranteed that the processor that receives the event will quickly find the related continuations in its local event table. The reason for the stall in the computation will have been satisfied.

Having dealt with the stall, the virtual-processor p will in effect be suspended. In between processing the stall and finding a new continuation to resume, p becomes an "anonymous shadow processor," i.e., a processor with no identity known to the operating system. This shadow processor then looks for a new continuation to resume. An example of this is shown below in the "assignProcessor" routine described in more detail below.

Notation

Let e be the event that stalled virtual processor p. Assume that e is triggered by local hardware of some physical node n. In particular, assume r is the resource, which caused the stalling event to occur. Resource r could be a block of memory, or an I/O operation, or a network operation. Assume that p is assigned to scheduler object s, which belongs to the subtree rooted at the scheduler object that represents physical node n.

On-Stall

The following are example details regarding an "on-stall" routine. The migration-continuation function returns true if and only if processor p in node n decides that the resource should not move, i.e., the computation should move. This can be determined by a number of factors such as history and frequency of movement of r between nodes, the type of r, the cost of movement, the number of events in n's local event table waiting for r, system load, etc. For example, it may not be desirable to move a resource if there is a continuation stored in n's local event table that is waiting for it.

A variety of patterns of events that would benefit from migrations exist. One approach to describing these patterns of events, like access violations, is in formal language theory. Regular (i.e., Chomsky type-3) languages can be recognized by finite state automata. In addition, using a compact and flexible notation, a description of the events that are observed can be made as sentences (or Chomsky sequences) in the regular language, and the recognition modeled as state transitions in the corresponding finite state automaton. When the full Chomsky sequence of events is seen, migration-continuation gets evaluated accordingly: if the finite state automaton accepts the Chomsky sequence, the condition is met, otherwise, it is not met. The length of the minimized finite state machine defines the amount of history that needs to be kept.

In various embodiments, all events happen locally, and the hyper-kernel on the physical node receiving the event must handle it—truly synchronous events are not assumed to occur between physical nodes. To coordinate migration strategy between nodes, "messages" are used. Message "sends" are synchronous from a node's point of view, but message "receives" are asynchronous, in that a processor or shadow processor, in general, does not wait for receipt of a message. When messages arrive, they are dealt with by the hyper-kernel as a virtual interrupt. In one embodiment, the hyper-kernel will not allow a processor to resume a continuation while there are messages waiting to be handled. Therefore, before control is transferred back to the operating system, the queue is checked, and any messages are dealt with prior to the transfer of control back to the operating system.

For scheduler object s and continuation c, a cost function cost(s,c) can be used to guide the search up the tree. If multiple ancestors of p have non-empty queues, then p may not want to stop its search at the first ancestor found with a nonempty wait queue. Depending on the metrics used in the optimizing strategy, p's choice may not only depend on the distance between p and its chosen ancestor but on other parameters such as length of the wait queues.

A function, find-best-within(s), can be used to return the "best-fit" continuation in a (non-empty) wait queue of a scheduler object. Examples of parameters that can be considered include:
 1. Position in the queue
 2. The relationship between p and the last location recorded in the continuation (the closer those locations are the better it may be for reusing cache entries).
 3. Performance indicators recorded in the continuations in the queue.

The cost and find-best-within functions can be customized as applicable within a given system.

Migrations Triggered by Asynchronous Events

Examples of asynchronous events include: receipt of a packet, completion of an I/O transfer, receipt of a resource, receipt of a message requesting a resource, etc. Generally, a hyper-kernel that receives an event corresponding to a hardware device managed by the operating system needs to deliver a continuation associated with that event to a scheduler object s. By doing so, s will make this continuation available to an appropriate scheduler object and then ultimately to the computation managed by the operating system represented by that continuation. If, on the other hand, the event is the receipt of a message from a hyper-kernel on another physical node, the hyper-kernel can handle it directly.

To simplify explanation, in the examples described herein, an assumption is made that there is only one continuation associated with an event. The procedures described herein can be generalized for the case where multiple continuations are associated with the same event, as needed.

In some embodiments, the search for a scheduler object on which to place the continuation starts at the leaf of the tree that built the continuation and then proceeds upward (if the computation previously executed on this node). By doing so, the likelihood of reusing cache entries is increased.

Handle-Event

Pseudo code for an example handle-event routine is provided below in the "EXAMPLE ROUTINES" section. The cost function, cost(s,c), is a function that helps determine the suitability of assigning c to scheduling object s. The cost function can depend on a variety of parameters such as the size of the wait queues, the node traversal distance between s and the original scheduling node for c (to increase the probability that cache entries will be reused), and the history of the virtual processor, the physical-processor, and the continuation. If the wait queues of the scheduler objects close to s already contain too many continuations, then it may take a relatively longer time until any newly added continuation is scheduled for execution. Example conditions contributing to cost(s,c) are described below, and the conditions can be customized as applicable.

Costs

Cost functions are used to evaluate options when selecting continuations and scheduling objects. Cost functions can be expressed as the summation of a sum of weighted factors:

$$cost = w_1 f_1^{x_1} + w_2 f_2^{x_2} + \ldots + w_n f_n^{x_n},$$

where $w_i$ indicates the importance of the corresponding factor and $x_i$ indicates an exponential.

Examples of factors $f_i$ are listed for each of the costs below. Weights $w_i$ and exponents $x_i$ can be determined in a variety of ways, such as empirically and by simulation. Initial weights and exponents can be tuned to various application needs, and can be adjusted by an administrator to increase performance. The weights can be adjusted while the system is active, and changing weights does not change the semantics of the hyper-kernel, only the operational performance characteristics.

Examples of the factors that can be considered include:

Length of time since the last processor evacuated this scheduler object.
Height of the scheduler object in the TidalTree.
Length of the work queue.
Reservation status (i.e., it may be the case that some application has reserved this resource for a specific reason).
Node specification (i.e., the node itself might have been taken out of service, or is problematic, has in some way a specialized function, etc.).
Age of the continuation in the queue.
Last physical processor to run this continuation.
Last virtual processor to run this continuation.
Node on which this continuation was last executing.

The "temperature" of the cache. (A cache is "warm" when it has entries that are likely to be reused. A cache is "cold" when it is unlikely to have reusable cache entries.)
Group membership of the continuation (i.e., the continuation may be part of a computation group, each element of which has some affinity for other members of the group).
Performance Indicators (Hints) and special requirements.

Examples

"OnStall" and "assignProcessor"

Figure 8:
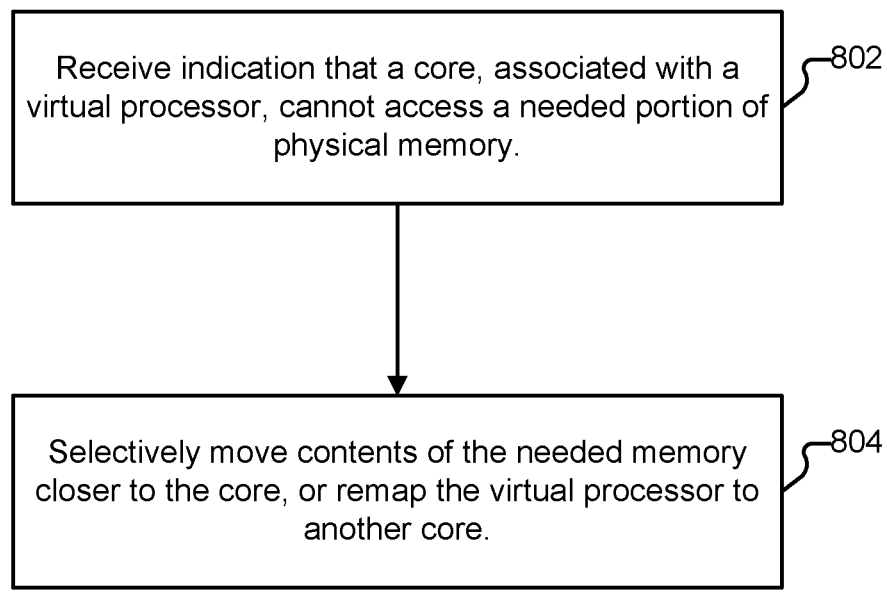
FIG. 8 illustrates an embodiment of a process for selectively migrating resources.

FIG. 8 illustrates an embodiment of a process for selectively migrating resources. In some embodiments, process 800 is performed by a hyper-kernel, such as in conjunction with the OnStall routine. The process begins at 802 when an indication is received that a core (or hyperthread included in a core, depending on whether the processor chip supports hyperthreads) is blocked. As one example, suppose a hyperthread receives a request, directly or indirectly, for a resource that the hyperthread is not able to access (e.g., RAM that is located on a different node than the node which holds the hyperthread). When the hyperthread fails to access the resource (i.e., an access violation occurs), an interrupt occurs, which is intercepted, caught, or otherwise received by the hyper-kernel at 802. In particular, the hyper-kernel receives an indication at 802 that the hyperthread is blocked (because it cannot access a resource that it has been instructed to provide). In addition to reporting its blocked state, the hyperthread provides information such as the memory address it was instructed to access and what type of access was attempted (e.g., read, write, or modify).

At 804, the hyper-kernel determines whether the needed memory should be moved (e.g., to the node on which the blocked hyperthread is located), or whether the requesting process should be remapped (i.e., the virtual processor should be transferred to a different node). The decision can be based on a variety of factors, such as where the needed memory is located, the temperature of the cache, the workload on the node holding the hyperthread, and the workload on the node holding the needed memory (e.g., overworked or underworked). In some embodiments, the workload of a node is determined based at least in part on the average queue length in the TidalTree.

If the hyper-kernel determines that the memory should be moved, the hyper-kernel uses its current resource map to determine which node is likely to hold the needed memory and sends a message to that node, requesting the resource. The hyper-kernel also creates a continuation and places it in its event table. The hyperthread that was blocked at 802 is thus freed to take on other work, and can be assigned to another virtual processor using the assignProcessor routine.

The hyper-kernel checks its message queue on a high-priority basis. When the hyper-kernel receives a message from the node it contacted (i.e., the "first contacted node"), in some embodiments, one of two responses will be received. The response might indicate that the first contacted node has the needed resource (and provide the resource). Alternatively, the message might indicate that the contacted node no longer has the resource (e.g., because the node provided the resource to a different node). In the latter situation, the first contacted node will provide the identity of the node to which it sent the resource (i.e., the "second node"), and the hyper-kernel can send a second message requesting the resource—this time to the second node. In various embodiments, if the second node reports to the hyper-kernel that it too no longer has the resource (e.g., has provided it to a third node), the hyper-kernel may opt to send the continuation to the third node, rather than continuing to request the resource. Other thresholds can be used in determining whether to send the continuation or continuing the resource (e.g., four attempts). Further, a variety of criteria can be used in determining whether to request the resource or send the continuation (e.g., in accordance with a cost function).

In the event the hyper-kernel determines that the continuation should be transferred (i.e., that the computation should be sent to another node rather than receiving the resource locally), the hyper-kernel provides the remote node (i.e., the one with the needed resource) with information that the remote node can use to build a continuation in its own physical address space. If the remote node (i.e., the one receiving the continuation) has all of the resources it needs (i.e., is in possession of the resource that caused the initial access violation), the continuation need not be placed into the remote node's event table, but can instead be placed in its TidalTree. If the remote node needs additional resources to handle the continuation, the received continuation is placed in the remote node's event table.

Figure 9:
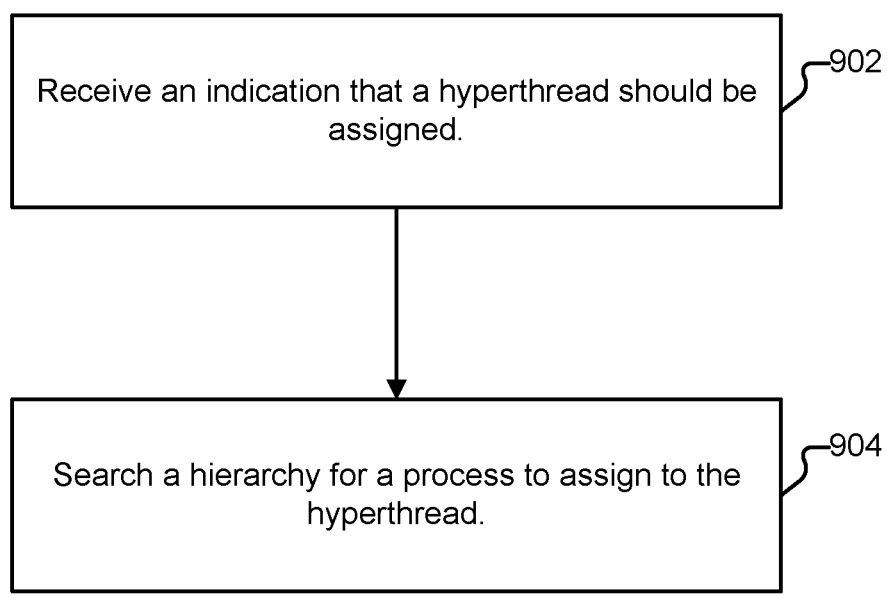
FIG. 9 illustrates an embodiment of a process for performing hierarchical dynamic scheduling.

FIG. 9 illustrates an embodiment of a process for performing hierarchical dynamic scheduling. In some embodiments, process 900 is performed by a hyper-kernel, such as in conjunction with the assignProcessor routine. The process begins at 902 when an indication is received that a hyperthread should be assigned. Process 900 can be invoked in multiple ways. As one example, process 900 can be invoked when a hyperthread is available (i.e., has no current work to do). This can occur, for example, when the hyper-kernel determines (e.g., at 804) that a continuation should be made. The previously blocked hyperthread will become available because it is no longer responsible for handling the computation on which it blocked (i.e., the hyperthread becomes an "anonymous shadow processor"). As a second example, process 900 can be invoked when a message is received (e.g., by the hyper-kernel) that a previously unavailable resource is now available. The hyper-kernel will need to locate a hyperthread to resume the computation that needed the resource. Note that the hyperthread that was originally blocked by the lack of a resource need not be the one that resumes the computation once the resource is received.

At 904, the TidalTree is searched for continuations that are ready to run, and one is selected for the hyperthread to resume. In various embodiments, the TidalTree is searched from the leaf-level, upward, and a cost function is used to determine which continuation to assign to the hyperthread. As one example, when a hyperthread becomes available, the continuation that has been queued for the longest amount of time could be assigned. If no continuations are waiting at the leaf level, or are outside a threshold specified by a cost function, a search will be performed up the TidalTree (e.g., the core level, then the socket level, and then the node level) for an appropriate continuation to assign to the hyperthread. If no appropriate continuations are found for the hyperthread to resume at the node level, the hyper-kernel for that node contacts the root. One typical reason for no continuations to be found at the node level is that there is not enough work for that node to be fully utilized. In some embodiments, the node or a subset of the node can enter an energy conserving state.

Guest Thread Overview

In the above, various embodiments were described in which it is shown how to create, manage, and optimize an instance of a virtual server (or computer) which is distributed over a tightly interconnected set of physical servers (or computers).

In order to make such a system run efficiently, sets of guest physical processors (virtualized processors) are associated with sets of virtual pages of memory (guest pages of memory which the guest operating system believes to be physical pages), so that they may be co-located across a set of computers (e.g., nodes in a cluster). When co-located, virtualization hardware in microprocessors may be used to achieve a performance level consistent with hardware-based non-virtualized servers.

The pattern of page accesses by VCPUs to sets of guest physical memory pages is defined by a combination of the application programs, operating system, networks, real time events, I/O devices, etc., and does not substantially change if executed on a virtualized server.

Modern operating systems such as Linux, FreeBSD, Windows, and Mac OS provide a set of features to implement asynchronous control structures referred to as "threads." Threads are software structures and mechanisms in an operating system or a run-time library (or both) that allow for asynchronous and parallel program behavior, often including responses to asynchronous events. Threads allow sub-programs to run different streams of instructions with different patterns of data access at different times. In the examples described herein, threads may be bound to a set of virtual processors under control of a scheduler running in a guest operating system. At any given point in time, a thread (e.g., guest thread associated with an application running on the guest operating system) is running on a VCPU or not running at all. At a later time, the scheduler may decide to run the thread on what it believes to be a different physical processor (which is in fact, a different virtual processor).

As described above, VCPUs in a virtualized environment may be bound to true (also called "host") physical processors through the implementation of the virtual machine and the virtual machine's scheduler (which may be different from the guest operating system scheduler).

Modern operating systems and hardware may often provide information to the hardware or the virtualization system about which thread is running in which VCPU at any given point in time, directly or indirectly.

An assumption is made by an operating system that it has direct and fast access to all resources (e.g., memory, I/O, networks, etc.) of the system. In a single virtual machine spanning a set of nodes built using the techniques described herein, this assumption is semantically preserved, but the physical realization may not be true. For example, there may be virtual processors (or threads) accessing non-local resources, where this non-local access is neither direct nor fast. As described above, when the virtualization system observes an event generated by the guest that is not physically realizable, a stall is generated. The virtualization system operates to correct or otherwise address the situation that caused the stall to bring it in line with the semantic behavior expected by the guest (application or operating system). The performance of the virtualized system is governed by the base performance of the guest operating system or application, but may be degraded by the number of stalls, and the total time taken to make the stall semantically accurate.

The pattern of access of virtual processors and sets of memory pages is in actuality determined by a guest thread running in a virtual processor under the control of a guest operating system scheduler. That is, when a virtual processor stalls, it is due to a portion of memory, referenced by the thread running in the VCPU, being inaccessible. Guest threads may run in different virtual processors, and hence host physical processors, at different times. VCPUs, and hence host physical processors, may run the same guest thread at different points in time.

The binding of threads to host physical processors depends on a variety of factors, which may include the programmed behavior of the guest scheduler, computations performed by the thread, a pattern of external asynchronous events (such as the arrival of a network packet), arrival of an I/O interrupt, etc. These events, and therefore the pattern of event arrival and the binding of the guest thread to a guest physical processor, may not be predictable in advance. Thus the actual behavior of the system may be non-deterministic, even if the program running is deterministic.

It may not be known by the hyper-kernel a priori which thread is running in which VCPU by inspection of the thread, since this is under the control of the guest operating system or a guest runtime library. For example, the guest operating system may perform thread context switching, where the operating system switches, moves, or multiplexes guest threads into different VCPUs. When the switch occurs, because the guest operating system doesn't know about the hyper-kernel, this may cause the thread to be moved away from its working set, resulting in stalls.

In some embodiments, based on the observation by the hyper-kernel of guest thread behavior and the pages of memory that they access, threads may be kept together along with the appropriate set of pages of virtual memory (guest physical memory), also referred to as the thread's "working set," on the same node, as much as possible. By doing so, the number and frequency of stalls due to non-local access may be reduced, and a performance level comparable to a real physical computer may be achieved. Further, the overhead (e.g., the product of the number of stalls and the average time per stall) may be reduced. This may be achieved by intelligently placing pages and threads where they will most likely not stall. The number of page transfers and page migrations may also be minimized.

Cache Coherency Protocol:

An example embodiment of a cache coherency protocol that may be used with a computing system such as the software defined server described herein is described as follows.

Pages on any node can be valid, or invalid. The validity/invalidity of a page refers to whether an entry to that page exists in some page table on a node. If they are valid, they correspond to an address that the guest operating system perceives to be a physical address, but is in reality a virtual guest physical address when viewed by the hyper-kernel.

A valid page p resident on a node n may be in one of several states: Prime (or primary), or Exclusive or Secondary.

1. If p is marked Prime, it is "read-only" and n is said to "own" p.

2. Nodes other than n may have copies of p, which are marked or called Secondaries. In some embodiments, if there is a secondary, it can be validly assumed that there is a prime somewhere else in the software defined server. Similarly, if a node has a prime page, then it can be assumed that there are secondaries of the page elsewhere in the software defined server. In some embodiments, the number of secondaries is maximized so that when attempts to read those pages are made, the page data is already resident on the requesting node, minimizing time spent accessing the page data.

One example of where a secondary may be desired is when handling a set of pages that hold the code of an operating system (e.g., guest operating system). Because the code for the operating system is constant and does not change, it would be inefficient if the processors running the operating system were to fetch pages for the operating system (as this may result in a stall while the processor is waiting for the requested page). Instead, to improve efficiency and reduce stalls, secondaries can be used, where as many pages of the operating system are replicated as possible. By reducing stalls, overhead in the system is also reduced, leading to increased efficiency of the system.

Similar optimizations and efficiencies can be performed for other kinds of programs, such as those with read-only data (where pages of the read-only data are copied as secondaries to read only nodes). In some embodiments, no distinction is made between code pages of an operating system or an application that are read-only pages of memory.

As another example, secondaries can be used that have large amounts of data that do not change very often. If the memory is available to do so, as much of the read-only data can be replicated as possible to improve efficiency and reduce stalls.

3. If p is marked Exclusive on n, the page can only exist on n, there can be no other copies, and the page can be read and written into ("read-write"). In this case, there are no secondaries for p.

In some embodiments, before a page is made exclusive, an invalidation operation is performed to invalidate all other existing copies of the page. This can be used to guarantee evaluation order in existing architectures. The invalidation operation can be performed by sending out messages to all other nodes, requesting that they invalidate their copy of the page. When responses (e.g., acknowledgments) to those requests are received, the receipt of all those responses indicates that there are no other locations at which the page exists. The guest operating system can then start up again and write to the page. When the write is completed, other pages may want to have a copy of the page, and in some embodiments, a snapshot of the page can be taken and used to create new secondaries that have the updated information for the page. Thus, through the use of secondaries, it will appear to the guest operating system that the pages are local.

When a vcpu on a node m (m≠n) requests access to p from n, if that page is Prime or Exclusive, the page p currently on n is marked Invalid, and a copy of the page is then sent to m which marks p as Prime. In some embodiments, as an optimization, the vcpu on node m may mark the page p as Exclusive if the vcpu on node m knows that is what is needed.

In some embodiments, if a node has a page that is prime or exclusive, then when it receives a request to send prime or exclusive writes to that page it is converted on that node to a secondary. The right to write into that page is then transferred to the node that is requesting the page. This is an optimization that may be performed based on an assumption that the node would not be requesting the page unless the node were going to write to the page. This saves a transaction in the protocol having to be performed, increasing efficiency.

In some embodiments, if node m requests access to p from n, then node n marks its copy of p as secondary. The page p is then sent to node m. If node m marks its copy of p as exclusive or prime, then node n's copy of page p is invalidated.

In some embodiments, if a page p on node n is Prime, and is to be written into, all secondary copies must be made invalid, and only after receiving an acknowledgement that this has been accomplished, n marks p as Exclusive. For example, in some embodiments, the page cannot be written into until it is known that node n is the sole writer—that is, the page cannot be written into until the page is in the exclusive state, where the page cannot be in the exclusive state until all acknowledgments have been received indicating that there are no other secondaries (i.e., all secondaries have been invalidated). In some example implementations, this can be optimized. For example, the node that is primary for this page can initiate the invalidations. In some embodiments, the invalidations include instructions that the acknowledgements should be sent to the requestor (who is about to become primary) NOT to the current primary. In some embodiments, the requester must collect all the acknowledgements before the page can be accessed. In this way, the invalidations can proceed safely in parallel with the transfer of the page. In summary, in this example optimization, the primary initiates the invalidations, but the requestor completes the invalidation process.

The following are additional details regarding invalidations. In some embodiments, the software defined server includes first level page tables, which perform hardware translation from the user space (e.g., guest program run in user space) to what the guest operating system believes is its physical space (i.e., the first level page table mapping translates virtual addresses into what the guest OS believes to be physical addresses). As described above, what the guest OS believes to be physical addresses are guest physical addresses managed by the hyper-kernel (e.g., hyper-kernel host addresses), which then go through another level of page address translation, in hardware (e.g., via a second level page table), where the guest physical addresses are converted or translated into true physical addresses of the pages. In some embodiments, a page is invalidated by erasing it from the second level page table. Garbage collection can then be run, or memory can be returned to a free pool, etc., as the nodes can no longer access the invalidated page of memory.

After this, all write operations to a page marked Exclusive will not generate any stalls, since they can be locally read and written into on the node, and no other copies exist (e.g., pages invalidated by erasing them from the second level page table, as described above).

Dynamic Reconfiguration of a Software Defined Server

Described herein is a feature of the hyper-kernel referred to herein as a "dynamic adaptive reconfiguration framework," which enhances system availability in a datacenter context by allowing dynamic reconfiguration of a software defined server without downtime due to failures or required (or desired) elasticity capacity changes to improve the efficient utilization of computing resources. That is, this additional layer of the hyper-kernel allows for dynamic adaptive reconfiguration of the software defined server while the system is running, without having to bring the system down.

The resiliency and reconfiguration mechanisms described herein are based in part on the framework of the software defined server architecture, which includes the aforementioned techniques for migrating and mobilization of virtualized resources (e.g., virtual CPUs, guest pages of memory, virtualized I/O, etc.) between nodes, as well as modularity.

Dynamic reconfiguration, as referred to herein, refers to the capability of changing or modifying the set of hardware components implementing or supporting a software defined system, while the system continues to run a guest operating system and its applications. That is, in contrast to existing data center systems, in which applications and virtual machines must stop running when making changes to underlying host hardware, using the techniques described herein, reconfiguration of the physical resources of an enterprise supercomputer such as a software defined server may be performed dynamically, without rebooting the guest operating system. From the guest operating system's point of view, no changes occur, and the guest operating system is unaware of the reconfiguration of the underlying host hardware. Thus, using the techniques described herein, resiliency is provided by providing the system and workload the ability to continue operating while minimizing downtime (resulting in high availability).

The guest operating system may have its own set of resiliency features that are independent of the hyper-kernel. These may be implemented in software, such as database log files and rollback capabilities, and in hardware, such as with redundant disks. In some embodiments, the dynamic reconfiguration mechanism described herein provides an additional set of resiliency features.

The distribution of failures among component types is typically skewed. For example, central processing units (CPUs) rarely fail, while network cables and switches fail relatively frequently (for example, CPUs fail infrequently, but over time they and the electronic circuits around them suffer cumulative damage that tends to limit their operational time to a few years, at which point they start to become unreliable). Power supplies may overheat, fans may fail, etc. In some embodiments, the dynamic reconfiguration mechanism described herein provides a framework for exploiting redundant hardware techniques that reduce the impact of failure of the components that are typically the causes of downtime. Also, normal preventative maintenance of components as they age may require the components be taken out of service, causing downtime. Using the techniques described herein, hardware failures are transformed into degradation of performance, which are then handled by dynamic reconfiguration.

For example, described in further detail below are "resilient logical modules," which, in some embodiments, are assemblies of one or more hardware components that have graceful failure modes, rather than those that cause immediate catastrophic failures. As described herein, a graceful failure involves a transition to a degraded state such that the system continues to function and no data is lost; depending on the degree of redundancy of available hardware, a later failure may be catastrophic if the failing component is not replaced.

This type of approach, in which a software defined server is composed of resilient logical modules through dynamic reconfiguration, allows a high level of availability (e.g., "continuous availability" with an arbitrary number of "9's" of availability) to be achieved, despite hardware disruptions (e.g., due to hardware failures, physical resource scaling, etc.). The primary causes of data center downtime typically have to do with shrinking the system capacity, growing the system capacity, and component failures while running (where outage times increase as existing data center systems become larger). Using the resiliency/reconfiguration mechanisms described herein, these causes need not result in any downtime of the software defined server. This also minimizes outage costs due to hardware (e.g., component failures, reconfiguration, repairs, etc.) by allowing for fail in place/scheduled repair, hot spares, etc., as will be described in further detail below. The outage costs due to software (e.g., software bugs, operator error, overload, etc.) are also reduced by allowing thin provisioning, which will be described in further detail below.

Example Use Cases and Applications

As described above, the dynamic reconfiguration mechanism described herein allows for various enhancements in system availability in a datacenter context, examples of which, without limitation, are by allowing dynamic reconfiguration of a software defined server without downtime due to failures, and by allowing required or desired elasticity capacity changes to improve the efficient utilization of computing resources. Using the techniques described herein, continuing operation of the software defined server is achieved despite hardware disruption (e.g., component failure, rescaling, etc.). Further details regarding such enhancements are described in further detail below.

Thin-Provisioning of Software Defined Servers

The ability to facilitate required or desired capacity changes to the software defined server (i.e., dynamic reconfigurability of the software defined server) is referred to herein as "thin-provisioning" of software defined servers. One advantage of the hyper-kernel described above is that it creates a layer of software in between a guest operating system and the underlying hardware. As a result, the hardware and the guest operating system and its applications are more loosely coupled than as compared to previous data centers. Thin provisioning leverages and exploits this loose coupling, allowing available virtual resources to move from hardware node to node, and be remapped onto physical resources dynamically (e.g., via the resource migration techniques described above). For example, storage volumes, memory, and central processing units may be instantiated by physical resources as needed, rather than be chosen and fixed in capacity for the duration of operation of the software defined server. As one example, a software defined server may be started with 1 TB (terabyte) of physical DRAM (dynamic random access memory) and 10 physical processors, and then later on have its physical instantiation be upgraded, while the system is running, to have more DRAM and more CPUs, without having to restart the guest operating system.

Because virtual memory pages, virtual CPUs, Input/Output (I/O) devices, and other virtual resources are mobile throughout the software defined server, and are dynamically reconfigurable, the virtual machine supported/presented by the hyper-kernel, using the techniques described herein, may add and remove sufficient physical resources that support the virtual resources, and then re-map them to additional or different physical resources. This provides flexibility to scale the system's hardware capacity up and down with a workload's requirements, as needed, resulting in a more efficient utilization of computing resources.

Indirectly, this also provides a form of resiliency, not only to failures, but also to utilization economies. Using the dynamic reconfiguration mechanism described herein, expanding and shrinking workloads may be easily and automatically accommodated. For example, excess resources can be used by other software defined servers until needed, and power requirements of the software defined server can be adjusted proportional to the needs of the workload.

Further details regarding thin-provisioning of software defined servers will be described below.

Fail-In-Place and Scheduling of Repairs

The ability to dynamically reconfigure a software defined server without downtime due to failures allows for fail-in place and further allows, for example, the scheduling of repairs. The dynamic reconfiguration mechanism described herein thus has an additional benefit for resiliency. Physical devices may be taken out of service for repair, replacement, or upgrades, while the software defined server and its guest operating system continue to run. Replaceable devices may be removed from the software defined server with disrupting it. Moreover, physical devices may remain in place for an arbitrary period until a removal for replacement or upgrade can be scheduled. Such flexibility is an improvement to existing data center environments, where the techniques described herein both reduce downtime by allowing the system to continue running, while at the same time allowing the appropriate repairs to be done properly, without, for example, the need for "emergency on-call specialists."

Further details regarding handling of hardware faults while allowing the software defined server and its guest operating system to continue to run are described below.

Modules and Components

As used herein, a "component" refers to any hardware portion of the software defined server, such as a chip, a board, a housing, a cable, etc. In contrast, as used herein, a "module" refers to a combination or collection of one or more physical components that are combined to create or provide an abstract function of the software defined server or hyper-kernel. One property of the software defined server module is that the module's hardware function may be understood without understanding the details of its constructions, and that its operational state may be described efficiently.

In some embodiments, resilient commodity hardware components with fault-tolerance are used in the software defined server (and to create modules), such as error-correcting code (ECC) memory, processor over-temperature slowdown, software redundant array of independent disks (RAID), multipath storage over fabric, bonded networks, etc.

Examples of types of modules in a software defined server are described in further detail below. In various embodiments, modules include: a node (e.g., one or more processor chips, a motherboard, its power supply, and a number of memory DIMMs (dual in-line memory modules), etc.), the interconnect network (e.g., the switches, cables, and NICs (network interface controllers) that provide inter-node connectivity), and an addressable guest network interface (e.g., one port on a hardware NIC). Other examples of module types will be described in further detail below.

Resilient Modules

As used herein, a resilient logical module is a module that fails gracefully (e.g., degrades rather than fails). Details regarding resilient modules and how each type of module needed by the hyper-kernel may be implemented as such a resilient module are described below.

Resilient modules include devices that fail into a degraded state. While suffering reduced performance, resilient modules continue to function, such that there is no data loss. However, a failure while in a degraded state may be catastrophic. Degraded components are those that need replacement in a timely manner to maintain system resiliency. Examples of such components include commoditized ECC memory, RAID1/5 volumes, bonded NICs, redundant power supplies, etc.

In some embodiments, a resilient module in a software defined server is an assembly of one or more hardware components that may be described as having one of five operation states:
1. Available
2. Operational
3. Degraded
4. Failing
5, Broken An Available module is a module that is ready for use in a software defined server, but is not actually in use.

An Operational module is a module that is connected to the software defined server and is being used by the hyper-kernel. An Operational module is functioning correctly with full performance.

A Degraded module is a module that is connected to the software defined server, and is being used by the hyper-kernel. Although it functions correctly, its performance may be substandard, and should be replaced in a timely manner, or it will enter the Failed operational state.

A Failed module is a module that is connected to the software defined server and causes the hyper-kernel to fail. A Failed module does not function correctly.

A Broken module is a module that is not connected to the software defined server. If a Broken module were connected to the software defined server, it would cause the hyper-kernel to fail. A Broken module does not function correctly.

A software defined server whose connected modules are each Operational or Degraded is functioning. A software defined server with any modules that are Failing is not working.

Available and Broken modules are not connected to the software defined server, and have no effect on system availability.

Figure 10:
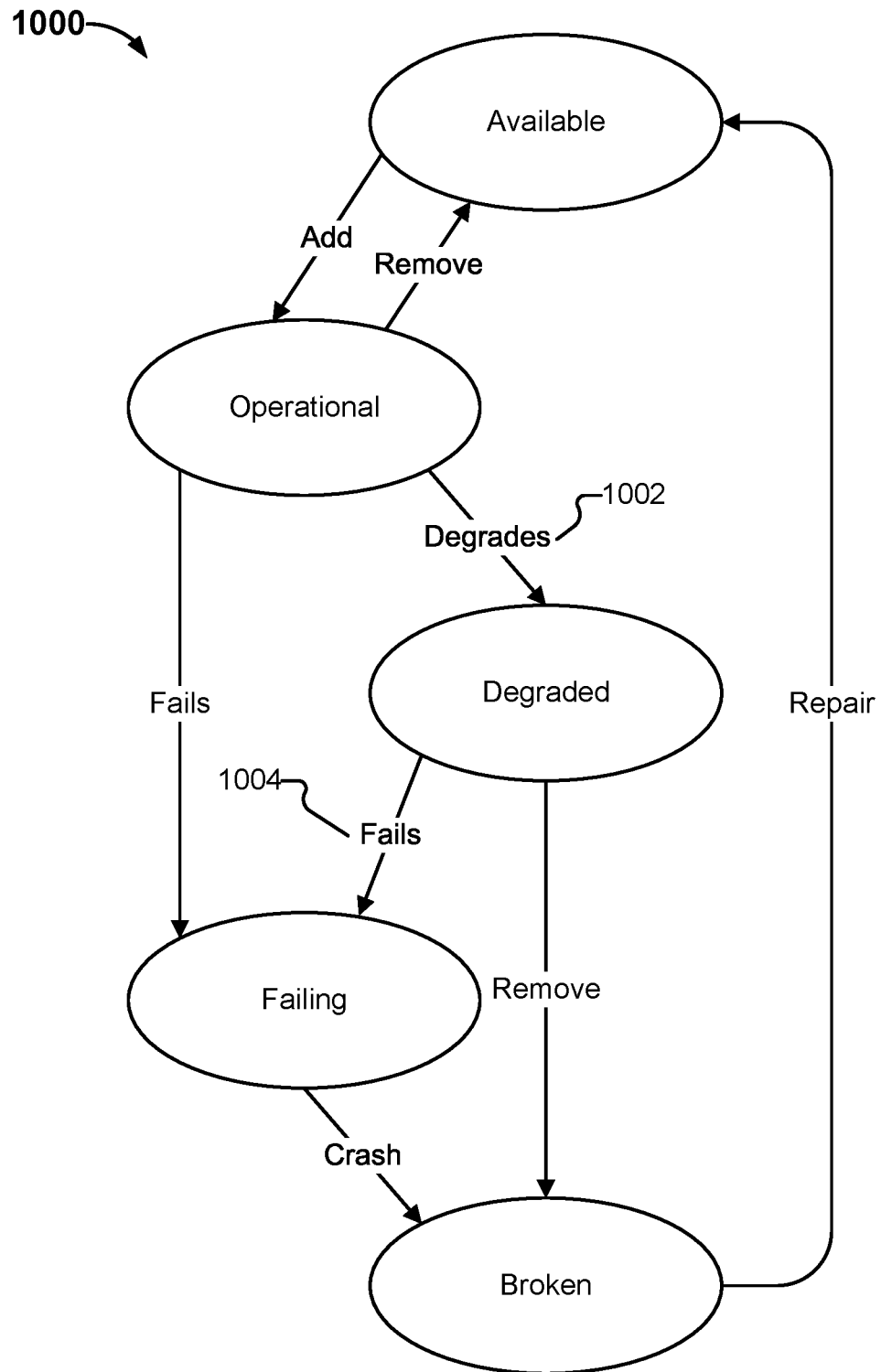
FIG. 10 illustrates an embodiment of an operation state transition diagram.

FIG. 10 illustrates an embodiment of an operation state transition diagram. Operation state transition diagram 1000 illustrates how operation states of a resilient module change during its life in a software defined server. The transitions labeled "degrades" (1002) and "fails" (1004) represent hardware faults internal to the module. In this example, the other transitions are caused by operations external to the module. A resilient module is unlikely to take the "fails" transition between Operational and Failing. In contrast, a non-resilient module is unlikely to take the "degrades" transition between Operational and Degraded.

As described above, logical modules are designed to fail gracefully. Using resilient physical components such as error-correcting memory, CPU modules that reduce their clock speed when overheating, software RAID, redundant switches, bonded network ports, etc., as described above, the majority of failures (e.g., 99.9%) will be those that fail gracefully and degrade, and result in transitions from the operational to the degraded state. That is, the most common data center failures may be made into resilient modules (e.g., power supplies, network connections (connectors, NICs), disk drives, ECC memory, etc.). Failure of a redundant component leads to degraded module operation, but the system stays up, needing repair. Those failures that cause transitions from the degraded state to the failing state will then be to cover second failures. In contrast, only a small number of failures (e.g., 0.01% of failures) will be those that directly transition a logical module from the operational state to the failing state.

Available modules may be added to or detached from the software defined server.

Broken modules may be detached from the software defined server or repaired in place (e.g., reseating a network cable). Broken modules should not be added to a software defined server.

Further details regarding resilient versions of modules will be described below. The use of resilient modules improves system reliability by dynamic reconfiguration.

Dynamic Reconfiguration while Running

As used herein, reconfiguration refers to a process of binding and unbinding logical modules to physical components, and virtual machine components to logical modules.

The distinction between logical modules and physical components is a form of virtualization (albeit, a type of virtualization different from the virtualization of processors, memory, and I/O devices to create a virtual machine that is performed by the hyper-kernel). In some embodiments, enhancing the hyper-kernel by adding the capability of dynamic reconfiguration involves creating a separation that allows for the substitution of hardware components upon which the hyper-kernel operates. For example, the hyper-kernel is divided into two layers. One layer includes logical modules (described in further detail below), which manage certain physical resources in the software defined server. The second layer is referred to as an "upper layer" of the hyper-kernel that works with any logical modules on any node.

Figure 11:
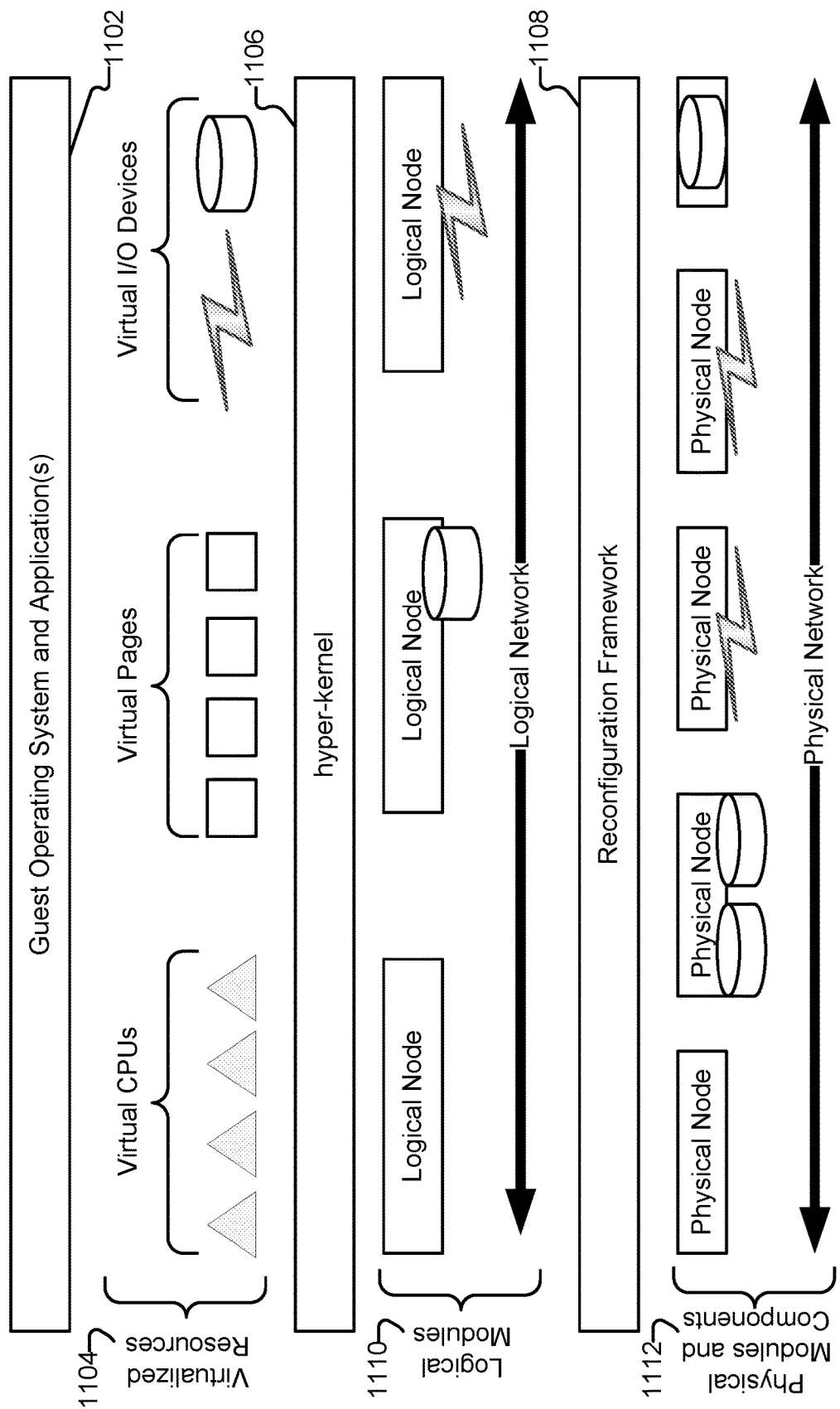
FIG. 11 illustrates an embodiment of a dynamic adaptive reconfiguration framework of a distributed hyper-kernel.

FIG. 11 illustrates an embodiment of a dynamic adaptive reconfiguration framework of the distributed hyper-kernel. As shown in this example, a guest operating system and application(s) (1102) execute on top of a set of virtualized resources (1104). The virtualized resources are presented by a distributed hyper-kernel 1106. As shown in this example, the hyper-kernel also includes a dynamic adaptive reconfiguration framework 1108, which includes a layer of logical modules 1110. As shown in this example, the hyper-kernel binds to the logical modules, rather than physical components such as physical modules and components 1112. As described above, the logical module implementation allows the freedom and flexibility for logical modules to migrate their use of physical components, such that physical components may be removed transparently.

In one embodiment, the logical modules, representing hardware components or other clumps of hardware resources/components in the hyper-kernel, are implemented as data tables. As will be described in further detail below, one example of a logical module is one that represents a physical disk drive. The corresponding data table describes, for example, where the disk drive is in the software defined server, what transactions are outstanding to the disk drive, etc. Thus, the logical module includes the metadata about the physical components maintained by the hyper-kernel. As the logical module is not hardware, the logical module may be migrated. That is, a logical module implementation is free to migrate its use of physical components, and physical components may be moved transparently. The migration of logical modules may be performed without the knowledge of the guest operating system. That is, this layer of logical modules is hidden from the guest operating system.

Thus, in the dynamic reconfiguration framework described herein, the hyper-kernel runs on an assembly of logical modules that are bound at any particular time to physical components. In turn, the hyper-kernel provides a set of virtual resources forming a virtual machine to the guest system, also by binding and unbinding virtual resources to logical modules. The dynamic reconfiguration layer described herein includes a layer, the logical module, that cuts across the architecture of the hyper-kernel.

As shown, there is a split between logical modules and virtualized objects. The hyper-kernel includes an internal layering of resilient logical modules that degrade rather than break. This allows for the dynamic reconfiguration of a software defined server while the guest continues to run, as well as the thin provisioning of physical resources. The dynamic reconfiguration technique described herein also provides a solution to two aspects of resilience, in that the system may continue to run despite failures of hardware components in resilient modules, and there is no downtime for scale changes or preventative maintenance.

Logical Module Types

In various embodiments, hardware components (of which there may be a wide variety that serve similar functions) are abstracted into a number of logical module types:
1. Nodes
2. TimeBase
3. BusPort
4. NetPort
5. StorageVolume In this example, a node corresponds to a hyper-kernel node. Internally, the node has CPUs and memory. A node is special, in that it may also hold other logical components of the other logical module types. Further details regarding holding are described below; holding represents a higher-level aspect of reconfigurability.

In some embodiments, there is one TimeBase in a software defined server. The TimeBase is the logical module that represents the timebase of the software defined server that is used, for example, to synthesize virtual timestamp-counters and various virtual hardware clocks in the system. In one example implementation of a software defined server, the TimeBase is the master clock, logically part of a specific node.

A BusPort is a logical module that represents a high-speed interconnection from a Node to the other logical nodes attached to an Internet switch. There is one BusPort held in each operational node.

A NetPort is a logical module that represents a Network Interface Port. For example, a Virtio network virtual device may be implemented using a logical NetPort.

A StorageVolume is a logical module that represents a logical drive controller. For example, a Virtio block virtual device may be implemented using a logical StorageVolume.

The relationship between logical modules and physical components in the system is not necessarily one-to-one. In some embodiments, drivers are used that translate between operations on the logical module and the physical components. In various embodiments, this may involve mapping logical module identifiers to physical component identifiers, but may also involve more complex mappings when multiple physical components are used to create a logical module that is resilient and reconfigurable.

Logical Module Dynamics

Physical components of a distributed logical module span multiple nodes. Logical modules may relocate, at any time, the function to span a different set of nodes. In some embodiments, relocation is function-specific. For example, to remove a node: network interfaces switch MAC addresses to an NIC port on another node; local drive array spanning nodes in RAIDS structure simply drop a drive on a node and add an empty driver on another; with respect to the timebase, the master moves itself to another node, and drops the current node. The guest operating system is unaware of the relocation. The relocation process introduces no disruption in function.

Logical Module Interface

In some embodiments, the logical module interface in the dynamic reconfiguration framework described herein is defined by a set of commands that are issued by the hyper-kernel that is using the logical module. Commands may perform their job/task either immediately or asynchronously. In some embodiments, completion of each asynchronous command is signaled through a completion queue. As one example, each completion is delivered as a kernel event (also referred to herein as a "kevent") on a kernel queue (also referred to herein as a "kqueue") specified in the command parameters when the command is issued. Other types of completion queues may be implemented.

In some embodiments, each logical module in a software defined server has a unique identifier, also referred to herein as its "logical module ID" (LMI). The scope of LMIs is global to the software defined server, during the lifetime of the software defined server as an entity. Nodes are logical modules, and therefore have their own LMI, which is a node identifier used in the hyper-kernel. As one example, the node identifier is used in the upper half of the hyper-kernel. In one example implementation, LMIs are represented as 12-bit unsigned integers (allowing for 4096 logical modules in a software defined server) and may be stored wherever node identifiers are stored (for example in data structures used for resource tracking of pages). The LMIs may be as large as needed.

Logical modules may be relocated infrequently, for example, only when reconfigurations occur. Commands issued to a logical module on one node may need to be transmitted to another node. In one embodiment, updates to logical module locations maintain a strictly consistent mapping of logical module locations across all nodes (which may be in contrast to the resource tracking used for virtual resources in the hyper-kernel, where the per-node knowledge of the location of virtual resources may be imperfect).

In some embodiments, the dynamic reconfiguration framework is implemented in part by an application programming interface (API) that is used by the hyper-kernel. The API may include commands issued to Logical modules as procedure calls. In some embodiments, a dedicated interconnect is used to turn a local procedure call into a remote procedure call.

For example, the API for logical volumes includes multi-block commands such as readblox, writeblox, and flush. The API also includes Async, for distributed completion queues. The APIs may be extended for guest memory transfer for block I/O, for example to inject guest page (even if current page at a guest physical address is remote) and to link to guest page (e.g., copy on guest page move).

Distributed Logical Modules

In some embodiments, a logical module is distributed across several nodes (while nodes themselves are not distributed). For example, the logical module's components may span multiple nodes at any one time. The following are two reasons a logical module may be distributed:

1. By instantiating certain types of logical modules on multiple nodes at once, resiliency or performance may be enhanced.

2. During reconfiguration, when a logical module's function is being replaced by new physical components on a new node, the transient state of the logical module is distributed. Since the hyper-kernel continues to run while reconfiguration is happening, a mechanism (described in further detail below) is implemented for managing the operation of the logical module across multiple nodes during this period.

Distributed logical modules also allow for quick node removal by abandoning components.

One feature of a distributed logical module involves using internal messages between nodes for internal coordination of the parts of the distributed logical module. Ordinary interconnect messages are addressed from the logical module implementation on one node to the logical module implementation on another node. The logical module implementations do not need to deal with virtual objects, so they need not interact with any of the hyper-kernel threads directly. In one embodiment, they are implemented with remote procedure classes that run in response to messages.

In one embodiment, a logical module command to the local module is a procedure call that returns quickly after doing its work. A command to a module that is not local to a node will be sent to one of the nodes involved in the module, and will return, for example, when the remote command handler returns. In some embodiments, remote asynchronous commands forward kevents to kqueues specified by the command issued.

Nodes Holding Modules

In modern hardware systems, certain components are physically embedded in nodes. For example, memory, processors, and I/O devices, in particular, are often embedded in nodes. Thus, repairing and replacing such components typically involves removing the node from the system, even if most of the node continues to operate.

Consequently, some node logical module holds each of the non-node logical modules of the system. In some embodiments, holding is a binding that represents that a logical device is implemented by physical components attached to a node.

For example, a physical NIC found in a particular physical node may be configured to implement a logical NetPort module, and the physical node may be implementing a logical node module. In this example case, the logical node holds the logical NetPort module. A virtual network device is then bound to the logical NetPort module.

In one embodiment, the node includes logical modules that are used to manage physical processors in the system. For example, the logical module is implemented as a thread data structure in a host operating system such as FreeBSD. This allows, for example, a standardized VCPU to be presented to the guest operating system. The physical processors across the nodes of the software defined server may be heterogeneous, with different capabilities, not all of which are presented to the guest operating system. The logical module corresponding to the standardized VCPU includes information defining what capabilities of the physical processor are provided/not provided. Thus, a standardized set of identical VCPUs may be presented to the guest operating system, even if the hardware CPUs are different (where the virtualized CPU is implemented on the logical module, which in turn is implemented on the physical resource).

As another example, pages of memory in the software defined server are also associated with logical memory modules, where a logical module for a virtual memory page includes information about the pages of virtual memory when it is local on the node, such as its GCPP entry. When a page of virtual memory is migrated, the corresponding logical module is also migrated as well. (Note: treating each page of virtual memory as a logical module may involve no additional overhead, because the software defined server architecture uses the same data structures to handle page motion between nodes)

As yet another example of a logical module, consider a virtual network adapter that is presented to the guest operating system. Suppose that in order to implement the virtual network adapter, the capabilities of two physical network devices on different nodes of the software defined server are needed. In one embodiment, in the hyper-kernel, there is a logical network adapter (example logical I/O device) that is being implemented by the two different physical adapters on each of the two nodes. While the guest is aware of the virtual network adapter (which it believes to be hardware), it is unaware of the logical network adapter. The logical network adapter includes the information needed to make the two actual physical network adapters work together to behave as a single adapter. For example, this information includes information such as the location of the two physical adapters, so that the two nodes on the physical adapters are aware of each other. When the virtual network adapter needs to move, the logical element of the hyper-kernel (logical network adapter) also moves in order to continue to work. Thus, in this example, the guest, running in the upper-level of the hyper-kernel, is not aware of the logical module. The logical module includes the information about the two physical adapters (e.g., location information), and makes decisions about which of the physical adapters is used to implement a request by the guest to the virtual network adapter. That is, the internal structure of the logical module includes such information about how to apply instructions to the different physical adapters.

As described above, the logical modules provide an implementation/realization interface between virtualized resources and physical components of the software defined server. That is, a logical module is a data structure of the hyper-kernel that includes information about the relationship between a virtualized resource (presented by the hyper-kernel to the guest operating system), and its realization/implementation on actual hardware componentry.

Distributed Logical Modules Held Across Multiple Nodes

Certain logical modules may be implemented in a distributed fashion, spread across multiple nodes. Such logical modules, referred to herein as "distributed logical modules" are held by all of the nodes involved. One example occurs with certain types of StorageVolume, such as those that have multipath capability implemented in either hardware or emulated in the dynamic reconfiguration framework/subsystem described herein. StorageVolume multipath will be discussed in further detail below.

The treatment of modules held across multiple nodes generalizes the treatment of modules held by one node. In some embodiments, in order to remove a node, all modules held by that node are made non-operational. For such multi-node modules, this includes changing the module's distributed implementation so that the node being removed no longer holds it. The opposite may also be performed—an operational node may be added as a holder of a distributed logical module. This will be described in further detail below.

General Configuration Changes for Modules

In some embodiments, in order to remove a physical node, both the logical node module and all logical modules it holds are removed. In one example implementation, a logical module is removed only when it is no longer Operational and is thus unused by the hyper-kernel. Another logical module takes over the functions of the removed module.

The holding relationship is one difference between node modules and other types of modules, which also affects the ordering of reconfiguration steps.

For example, suppose that there is a logical NetPort module, New, that is Available and that meets the requirements for taking over from the logical NetPort module, Old, that is to be removed. Before the removal of Old, which is in either the Operational or Degraded state, the virtual logical binding of the virtual network port is changed from using Old to using New instead, and the status of Old is changed to Available. This includes assigning the Media Access Control (MAC) address used by Old to New, then waiting for all operations in progress on Old to complete, while directing new operations to use New. When Old is no longer operating, it transitions into either the Available or the Broken state. As described above in the operation state transition diagram of FIG. 10, nodes in the Available or the Broken state may be detached safely from the software defined server.

VCPU, Page, and I/O Device Evacuation

Before removing a logical node from the software defined server, it should no longer contain any guest state. In particular, guest pages and VCPUs should not be active on the logical node. The process of removing guest pages, VCPUs, and I/O devices is referred to herein as "evacuation." In the hyper-kernel architecture described herein, evacuation includes the hyper-kernel mobilizing VCPUs, pages, and I/O, using, for example, the resource migration mechanisms described above.

One issue in evacuation is the handling of guest pages that are "wired" to a node. In some existing systems, certain guest pages may be permanently mapped, for example, to user space pages, for unbounded periods of time. As another example, certain pages may be wired into memory, where such pages would have to be moved from one memory module to another. In existing solutions, such pages had to be moved from one memory module to another. This is inadequate or problematic, for example, in situations where I/O devices retain direct addresses to particular addresses in particular memory modules, such that any I/O buffers in use prevented the removal of memory modules containing those addresses.

In contrast, in the architecture described herein, the hyper-kernel makes all virtual pages mobile among nodes (i.e., no "wired" pages), such that the virtual pages may be moved at any time. In one embodiment, the software defined server does not map guest pages to user space, and I/O device emulations deal with pages that move by stalling on access to a non-local page, then either requesting the page be moved to the node where the emulation is running, or else moving the I/O device emulation thread to the node containing the virtual page.

Thus, the dynamic reconfiguration layer described herein is supported in part by guest pages not being "wired" to a particular node. This allows for evacuation pages from a node to be possible at all times. As a note, transfers of data into or out of a guest page do not "wire" the page. In some embodiments, transfers, whether by a VCPU or I/O emulation, are performed as a unit operation that holds the guest page in memory only long enough to complete the transfer. Described in further detail below, in conjunction with the discussion of StorageVolume modules, are examples of two mechanisms that avoid many I/O related data copies: replacing a guest virtual page with a page of non-guest memory, and creating a "copy-on-write" clone of a guest virtual page. Otherwise, I/O emulations break up their transfers into chunks within pages, and perform the transfers to/from each virtual page, one at a time.

VCPUs may migrate to a different logical node whenever they stall. To evacuate any VCPUs that happen to be on a node, a stall is invoked, and upon that stall, a migration of the VCPU takes the VCPU off of the node. Similarly, virtual pages may be removed at any time to another node, by an operation that moves the owner of the page. For pages that are secondary copies (e.g., of read only pages), these pages may be deleted without transferring the page anywhere.

In one embodiment, evacuation of all virtual pages is performed by looping over all pages in the node, and sending each guest virtual page to another Operational node in the software defined server. Similarly, in one embodiment, evacuating of all VCPUs is performed by looping over all VCPUs in the node, triggering stalls that force each VCPU to move to another Operational node.

Two examples issues to be dealt with during evacuation while the software defined server is operating are: resource tracking and migration blocking.

Resource tracking problem: In some embodiments, all virtual resources (e.g., VCPUs, virtual pages, and virtual I/O devices) are tracked by a distributed resource-tracking algorithm that keeps track, on each node, of where the resource was last sent. In one embodiment, tracking data includes a chain of node pointers that are followed to find a resource that is not on the current node. When a resource is moved during evacuation, other nodes in the system may still be operating under the assumption that the resource is on the evacuated node. Consequently, the evacuated node may receive requests for those resources that have moved. Typically, these messages would be forwarded to the node to which the resource has been moved, but this may not be possible once the evacuated node becomes non-operational.

Migration blocking: In some embodiments, in order to complete or finish evacuating a node, resources should not move to that node. Consequently, other nodes should be notified to not send resources to the evacuating node.

The above two example issues are addressed using the following example evacuation process, which proceeds in multiple steps, as follows:

A. The evacuated node informs all nodes that it is no longer a destination for migration of VCPUs, guest virtual pages, or virtual I/O devices. The evacuated node may still receive requests for resources, which the node (or hyper-kernel on the evacuated node) handles or forwards as appropriate during the evacuation phase.

B. The evacuated node then begins evacuating pages, VCPUs, and virtual I/O devices that are present.

C. Each evacuated resource generates a special location update message, which is broadcast to all other nodes by the evacuated node, indicating that a resource has moved from the evacuated node to the new node (i.e., a message that notifies other nodes of the updated location of the resource). In some embodiments, evacuation location updates are bundled into messages (e.g., of medium size, or any other size, as appropriate) on the interconnect, reducing the overhead on the interconnect (e.g., to a small ~16 bytes/resource).

D. Upon receiving an evacuation location update for a resource R moved to node N from evacuated node E, a node checks where it believes R is, and if it is E, then the node accepts N as its new location for the resource R.

E. When evacuation of node E is complete, E broadcasts an evacuation complete message (indicating completion of the evacuation of resources) and waits for response from all other nodes (acknowledging receipt of the evacuation completion message).

F. When a node receives an evacuation complete message from node E, it scans its own local tables to verify that no resource is now thought to be on E. If that is true, the node responds with an evacuation OK message. If not, then the node sends one or more evacuated location request(s) for locations of all resources still thought to be on E.

G. When E receives evacuation OK messages from all nodes, node E moves out of the Operational state. While waiting for the evacuation OK messages, node E handles evacuation location request(s) responding with evacuation location update messages.

As described above, I/O mobilization supports the ability to allow a virtual I/O device to be re-bound to a different logical module on a different node. There are two bindings that are involved: virtual-to-logical, and logical-to-physical. A virtual I/O device is mobile—it may be accessed from any VCPU, and the virtual I/O device may access any virtual page without having to move the logical module or physical devices used in its implementation. Consequently, in one embodiment, the evacuation process handles the virtual I/O devices, whereas the logical device bindings are handled by the logical module binding's move from one physical node's components to another.

StorageVolume Modules

Storage devices come in many varieties. Locally attached drives, removable drives, network attached storage, and fabric attached storage are but some examples of the various options that may be used. In the dynamic reconfiguration architecture described herein, such storage devices are represented by a single type of (possibly distributed) logical module, the StorageVolume module.

In particular, under the dynamic reconfiguration architecture described herein, the hyper-kernel virtualizes block devices (e.g., whether using Virtio or emulating Peripheral component Interconnect Express (PCIe) hardware interfaces) using a common internal StorageVolume API, which provides, for example, queued asynchronous I/O requests within a node (and which may be optimized, for example, for handling virtual 4K page-sized and page-aligned blocks). As a note, some operating systems such as Linux, FreeBSD, and Windows are designed to attempt to use page granularity on their disk file systems wherever possible, and keep page-aligned storage caches wherever possible. While they can support different disk block sizes in their file system code, they typically use their virtual memory layer to manage their disk caching, so their unified disk caches only cache page sized, page-aligned blocks.

In one embodiment, the higher level hyper-kernel emulates block devices using the common StorageVolume interface. For example, the hyper-kernel implements emulations of Virtio-block Advanced Host Controller Interface (AHCI)/AT Attachment Packet Interface (ATAPI), as well as NVME Express (NVMe) virtual devices (as a note, NVMe, though defined for hardware implementation, has benefits as a guest interface for storage virtualization as compared to the Virtio-block interface, because it uses natural 4K page-sized transfer, and supports more efficient queueing protocols). In some embodiments, such emulations (run, for example, on virtual I/O processors, also referred to herein as "VIOPs") acquire command chains containing descriptors from queues in guest virtual memory, and translate those commands into block level commands to logical StorageVolumes. The virtual block device emulation code does not need to know how the StorageVolume effective "drivers" implement devices, and the Storage Volume drivers do not need to have knowledge about guest virtual memory, interrupt signaling, etc. This separation of concerns provides reconfiguration flexibility.

A StorageVolume may be distributed among multiple nodes (i.e., a distributed logical module), and therefore any or all of the nodes may be involved in a particular block-level command. For example, a StorageVolume may be implemented using multiple disk drives across several nodes, where the drives are mirrored using Redundant Array of Independent Disks (RAID), or striped to allow parallelized transfers to/from different nodes. In some embodiments, the StorageVolume driver code is configured to route block-level commands to the right disk drive(s) on the correct node.

In some embodiments, all virtual storage volumes may be configured to have 4K block size. Zero copy of virtual-logical data transfers may be performed by mapping. Logical volumes are independent of physical volumes, where RAID/multipath redundancy is managed by the hyper-kernel.

As a second example, a fabric-attached StorageVolume supporting multipath access may be connected to several nodes, again presented to the hyper-kernel as a distributed StorageVolume across some or all of those nodes (or only to a single one of the nodes). In this example case, block-level commands issued to the distributed StorageVolume may be directed to any one of the elements of the distributed StorageVolume.

As described above, StorageVolumes are potentially distributed, where reconfiguration often temporarily puts a StorageVolume in a distributed state, as the paths to content and contents themselves are transferred among nodes.

In one embodiment, the interface to the logical StorageVolume deals with page-sized blocks. For writing to the StorageVolume, one or more blocks are provided to the StorageVolume, the transfer is done, and the block is released back to the system. For reading from the StorageVolume, one or more blocks are provided to the StorageVolume, the transfer is done, and the block is released back to the system with the contents updated. Transfer completions are signaled on a completion queue, along with a status block indicating the transfer's success/failure. In one example implementation, the completion queues use the kernel event mechanism (kqueue) in the operating system FreeBSD. In some embodiments, a flush command is provided that allows forcing of one or more blocks into stable storage.

The same interface may be used even when the transfer is smaller than a block, where, for example, only a portion of a page-sized block is read or written in the physical device.

Efficiency of Block Transfers and Virtual Page Mapping

The use of page-sized and page-aligned blocks results in the most common case of I/O involving only re-binding of the current instance of a virtual memory page. This is more efficient than copying data multiple times. In most cases, I/O may be done with zero memory-to-memory copies.

Reading data from a drive into a block creates a new memory page on the node containing the device. Once the read is complete, the memory page is substituted in the guest virtual memory for the page that is the guest's I/O target. During I/O, the old page still takes up space in memory. However, once the I/O operation begins, the page will ultimately be erased. Thus, as soon as the I/O operation is queued, the hyper-kernel may erase the page. If the target of the I/O is, in actuality, on another node, this is not consequential. While the page read is in progress, the target page may be erased and a dormant instance moved to the node performing the I/O. In some embodiments, pages in the system that have not yet been zeroed are indicated as "dormant" pages. In some embodiments, these dormant pages are zeroed on an ongoing basis or are not zeroed until the first time that they are used (e.g., allocated and written into or created). When the page read is complete, the new contents are in a page that may be substituted for the dormant page. If the dormant page moves off of the node in the interim (which may be unlikely as it will not typically be accessed), the new contents of the page may be sent to wherever the page has moved.

Writing data from a block to a drive is similarly optimizable. In one embodiment, the page to be written should be on the node of the StorageVolume driver (if distributed, the page may be moved to whatever node can most efficiently perform the write). If not already there, a copy may be used. The page may become designated as a PRIMARY page, moved to the device as a SECONDARY copy of the page, leaving the PRIMARY page where it is (where PRIMARY and SECONDARY are examples of states that a page or copy of pages may be in). This creates a "copy-on-write" situation for the guest page during the time the write of the block is in progress. The virtual page instance being used by the StorageVolume may be moved or deleted, but the instance will retain its contents, and is not freed until the write operation is complete. In one embodiment, this feature is implemented by adding a flag to each page in memory marking the page as in-use by a StorageVolume write.

Relocating a StorageVolume in Dynamic Reconfiguration

StorageVolumes contain large amounts of guest data that must be preserved, and will continue to be accessed during dynamic reconfiguration. Thus, when a node must be removed, the data in any StorageVolumes held by the node should be preserved. Different preservation processes may be used depending on how the StorageVolume is implemented in physical media. However, in all cases, the same command to the StorageVolume may be used to accomplish the preservation, where this command to the StorageVolume is referred to herein as StorageVolume relocation.

In some embodiments, a logical StorageVolume is relocated from one set of nodes containing devices to a new set of nodes containing the same or other devices. The command issued to the StorageVolume (which is aware of how and on which nodes it is currently implemented) specifies the target set of nodes to be used (which may overlap with the current set of nodes used), and any new devices on those nodes that may be used. The StorageVolume driver is configured to carry out the steps to implement the relocation. During relocation, the logical StorageVolume expands to include the source set of nodes and the target set of nodes, then shrinks or contracts to include only the target set of nodes. This expansion/contraction approach allows the APIs to the StorageVolume to hide information regarding the internal implementation of StorageVolume drivers from the rest of the hyper-kernel.

Example of How StorageVolumes are Relocated

Consider, for example, a multipath-capable fabric-connected storage. In this example, relocation includes updating the set of nodes from which the remote storage device may be accessed, and initializing any new connections in the relocation target set, while shutting down any connections on the nodes being dropped from the relocation set. Since the contents are remote, no transfer of contents is required.

As another, more complex example, consider the relocation of a single volume that involves one or more locally attached drives on a single node.

One example approach involves transferring the contents by moving the physical drives themselves from slots on one node to slots on another node. In this approach, there may be a short time (which may be on the order of several seconds) during which the drive will be inaccessible to the guest. Further, a human operator may be needed to manually move the physical drives, which if done incorrectly, may cause the system to crash. Other approaches that improve system availability are described below.

As another approach, suppose that there are spare, empty locally attached drives on other nodes (e.g., on the replacement node taking over from the node that is failing), or a remote fabric-attached backup storage device. A relocation may be performed by copying the contents from one volume to another. Assuming the node being removed is continuing to run adequately, such a migration may be performed, but may take time. The logical volume becomes temporarily distributed across two nodes, and internally manages the commands to be redirected to the device containing the current copies of blocks as they are copied.

Thus, logical StorageVolumes of all types may be replicated at some time during their lifetime—if only during relocation.

As yet another example, a more complex form of local storage may avoid having to keep a degraded node running for a long time while its StorageVolumes are copied off. In one embodiment, this example form involves using RAID-style distribution of parts or portions of a RAID volume across multiple nodes. For example, a StorageVolume may be implemented as a RAID5 array across four nodes, each containing one drive. Each pair of logical blocks would be represented as three physical blocks on three successive drives, where two of the physical blocks are the logical blocks' contents, and one of the physical blocks is the parity block, which contains the bitwise exclusive-or of the logical blocks' contents. If it is detected that one of the four drives fails, then the StorageVolume transitions to the degraded state. However, the physical contents of that drive may be reconstructed by combinations of bits from the physical blocks on the other three drives. Thus, a single drive failure may be handled by adding a new, empty drive on any node to the RAID distributed volume—this is an example of a relocation operation. However, if one of the nodes degrades in some other way, the drive on that node may be reconstructed in the same way without requiring the drive on the degraded node at all.

Thus, one beneficial result of locally distributed StorageVolumes using RAID5 style structures is that nodes may be replaced quickly, leaving the reconstruction of StorageVolume contents on that node to be done at leisure after the reconfiguration is complete.

One potential cost of using a distributed StorageVolume of RAID5 style across nodes is that writes to the StorageVolume may be slower, as any write involves an update to both the logical block and to the parity block. Instead of one write, this requires an extra write, and possibly a read of the other logical block covered by the parity block, if it is not in memory. By distributing the physical devices across nodes, at least one block's worth of data may also have to be transferred between nodes, as well. However, the RAID structure also has performance advantage, where, for example, it allows high-speed loading of data into memory, because of the doubling of bandwidth from physical storage into memory.

Summary of StorageVolume Reconfiguration

There are various implications of the above described design in terms of its architectural flexibility.

As described above, block I/O is accomplished through a common API internal to the hyper-kernel that communicates to the StorageVolume abstraction, implemented by a StorageVolume driver. In some embodiments, StorageVolume drivers are implemented on multiple nodes, as distributed logical modules. Distributed logical modules may be relocated so that one or more nodes no longer hold the StorageVolume. Such relocation is one way to replace a node holding a StorageVolume.

The StorageVolume is designed in such a way as to hide many details of common storage systems from the guest virtual machine supported by the hyper-kernel distributed virtual machine manager, which instead is presented and sees simple block drives. In some embodiments, the details of storage devices, connectivity, etc. may be reflected through to the guest operating system, which may then handle these details on its own, even through the mappings provided by inverse virtualization across nodes. However, it may be more beneficial to apply the modularity achieved by inverse virtualization to hide complexity from the guest operating system, while at the same time allowing better performance and higher resiliency.

The StorageVolume abstraction described above creates a strict separation between how virtual block devices obtain their instructions from the guest operating system, and how those instructions are mapped to commands issued on physical devices. While direct "pass-through" of commands may be used, it has been shown in some existing virtual machine implementations that direct pass-through of block device commands performs poorly because the mapping of interrupts and Direct Memory Access (DMA) add cost and complexity. In contrast, both performance and resiliency may be enhanced by having the virtual machine manager (hyper-kernel) be responsible for driving the devices.

NetPort Modules

One other category of I/O devices (in addition to the block devices described above) is network interfaces. In contrast to StorageVolumes, network interfaces need not manage "contents." As described above, substituting one physical NIC port for another may be performed. For example, the MAC address, one aspect of a NIC port that uniquely identifies the NIC port, may be reassigned quickly (e.g., in milliseconds)

Again, the reconfiguration framework described herein splits the emulation of a guest network interface port (e.g., implemented using Virtio-Net, or any other standard, as appropriate), into two parts—the guest facing upper half, and NetPort logical modules that handle all of the issues of dealing with the physical hardware.

In contrast to block devices, where guest operating systems typically perform I/O using page granular, page-aligned buffers, existing operating system networks are typically not well organized for zero-copy transfers organized around page-sized units.

As one example, the structure of I/O operations to NetPorts is as follows. Commands are issued to the NetPort logical module, either synchronously or asynchronously, to read a packet or write a packet to the physical device currently being used by the NetPort to implement the logical network port.

In some embodiments, when a packet is being sent, it is copied out of guest virtual memory to a list of real local memory blocks by the hyper-kernel, and this copy is provided to the NetPort logical module. In some cases, the copy will be to an mbuf (an example of a memory buffer) on the node where the page resides, with the mbuf being provided to the logical module. This simplifies the sending from/through a local device or a remote device—mbufs are used in the hyper-kernel for both.

The NetPort logical module may transfer the copy across the dedicated network interconnect from where the copy was made to the physical device's node. This copy may be smaller than a page, and avoids the need to copy a large amount of other data in the page to the device, resulting in a reduction in interconnect traffic. Upon completion, the status is put in a completion queue.

In some embodiments, packets being received are placed in local memory buffers, which are returned in a completion queue, using, for example, the command/completion queue interface described above. In some embodiments, the memory buffers are provided to device emulation code, which copies them into guest virtual memory. Again, in some embodiments, an mbuf chain is used as the form of data returned upon completion of a packet receive. The mbuf chain may then be copied into the virtual pages a chunk at a time, and if the pages are remote, the mbuf chain may be transferred over another interconnect that is configured to handle mbufs as part of its packets.

Initialization and Shutdown of Nodes in the Software Defined Server

In some embodiments, initialization of a node places a node in the Available state. Shutdown of a node may be performed after the node is in either the Available or the Broken operational state. Details regarding removal of a node have been described above, which places the node into the Available or Broken operational state. In the Available and Broken states, the hyper-kernel and logical modules are still functional, their data structures that track logical modules and memory state are initialized, etc. These states may have similarities. One example of a distinction between Available and Broken is that a node in the Broken state needs repair of some kind before it may be added back to a software defined server, whereas a node in the Available state is ready for use.

In the dynamic reconfiguration framework described herein, an Available node is "warmed up" and ready to be added to a software defined server. Initialization of a software defined server node occurs before it is brought into the Available state, details of which will be described below.

Shutdown of a software defined server node includes various steps, where for example, some state may need to be saved before powering the node off (i.e., state preservation may be performed during shutdown).

In some embodiments, in order to implement the dynamic reconfiguration framework described herein, the initialization of the hyper-kernel is structured into two steps, with a third step that starts the software defined server.

Step 1—Initialize each node separately, bringing the node to the Available operational state. This step does not require interaction among nodes—node initialization may occur in parallel. In one embodiment, the recipe or process for initializing each node is communicated to the node in textual form.

Step 2—Apply software defined server-specific parameters to one or more nodes, putting them into the operational state. Two types of descriptions are included at this point—software defined server-wide parameters (e.g., guest address space size, number of VCPUs, etc.), and a definition of the logical modules that are to be held on each node, initially.

Step 3—Select a single node as the "boot node" and provide bootstrap information, starting the software defined server. In some embodiments, all VCPUs and non-dormant memory are initialized on the boot node. However, after such initialization, there is no distinction or difference between the boot node and other nodes. For example, the boot node may not even be logical node 0. One characteristic of the boot node is that the VCPUs are initially found on that node.

In the reconfigurable software defined server described herein, any node may be removed (e.g., either to scale down needed resources or to perform replacement due to failure). This includes the node that originally started or booted the software defined server, which as described, after initialization, is no longer differentiated from other nodes.

Administration and Management of the Software Defined Server in the Context of Dynamic Reconfiguration and Resilient Logical Modules In some embodiments, a software defined server is administered from an external system, referred to herein as the "admin node." In one embodiment, the admin node is implemented as an external management service on a server. The external management service commands node actions during startup, reconfiguration, removal, etc., but may not be necessary during guest operation. Once the software defined server is running, the admin node is no longer required to be operational. This ensures that the admin node does not become a single point of failure that will cause the software defined server to fail. The administration system provides monitoring/management capabilities to manage physical components in the software defined server. For example, the external management service performs external monitoring of physical component health and allows for manual or automatic failure response. In some embodiments, the nodes of the software defined server maintain configuration and health information needed by the management service in case the management service fails.

As will be described in further detail below, administration functions are provided and implemented that may be used to monitor the software defined server and reconfigure it, shut it down, etc.

In one embodiment, the dynamic reconfiguration framework provides administration ports on each node (which may also be replicated) that may be used to administer each node by any (authorized) node that provides the administration server. Those ports provide a path for logging data about operations, collecting system health information, etc.

Those ports also support a protocol that allows for querying the current system configuration status. Rather than keeping system configuration in an external structure, which could be inconsistent or unreliable, the dynamic reconfiguration layer on each node provides introspection capabilities such that a new "admin node" may discover the information needed to administer the software defined server, should the first "admin node" fail.

The functionality of the introspection interfaces provides the ability to inventory all logical modules currently operating in the software defined server, all nodes whether operational or not, and the physical devices in each node, along with their usage by logical modules. This is also a point of coordination with an administration console. In one embodiment, the administration console for the software defined server is a program running outside the hyperkernel that controls the dynamic configuration changes by using the introspection interfaces. In various embodiments, the administration console is implemented within a separate computer connected to the software defined server, or on one of the hardware nodes of the system as a process that runs concurrently with the hypervisor. If it is implemented on one of the software defined server's nodes, then it is stopped and restarted on another computer if the node is to be removed from the server.

The TimeBase Distributed Logical Module

In some embodiments, the TimeBase module is responsible for ensuring the invariants related to guest virtual time across all nodes of the software defined server. The design invariants of time sources and time event sources in the hyper-kernel are twofold:

1. Virtual time can never "go backwards" from the guest operating system's point of view, and
2. Virtual time maintains a constant rate relative to external wall clock time as seen through all virtual time sources and time event sources.

The invariant rule regarding "going backwards" may be complex, as there is a causal ordering between time as read from virtual clock devices and guest virtual memory contents that must not be violated (for example if two VCPUs read the same clock, the ordering of memory operations they carry out before and after the clock readings must conform to a causal serialization of the memory accesses carried out by the VCPUs). This is required because the causal ordering is assumed for correctness in many guest synchronization techniques that use, for example, the time stamp counter (TSC) of the Intel instruction set along with memory access ordering constraints.

In some embodiments, these invariants are achieved in the software defined server by using a single distributed very high resolution clock that is effectively synchronized among every pair of nodes (e.g., with less than microsecond disparity among every pair of nodes), and a rule that effectively delays each guest-level transfer information between nodes such that such a transfer never arrives at a local time earlier than it was sent. If the interconnect has a transfer latency greater than the disparity between the pairs of nodes, then there may be no need to delay at all, unless the time synchronization allows time to diverge. This may be achieved by controlling the effective rate of the virtual clock so that each node's virtual clock has an identical rate on an order of, for example, parts per-million.

With respect to the TimeBase and dynamic reconfiguration, maintenance of synchrony and rate are also taken into account during adding or removing of a node. For example, a new node is synchronized to the existing node when it becomes operational.

BusPort Logical Modules

In one embodiment, the interconnect among nodes of the software defined server is made resilient by increasing redundancy. In some embodiments, the dynamic reconfiguration framework achieves this by using multiple ports on each node and multiple switches, such that the failure of a switch or a cable merely degrades performance, but an alternate (redundant) delivery path exists.

In one embodiment, the hyper-kernel assumes in-order message delivery, and the interconnect protocol manages the choice of paths to a particular node destination internally to the BusPort logical module, which corresponds, for example, to the network kernel implementation of the hyper-kernel. In some embodiments, selection of paths and detection of failed paths are performed in the network kernel driver. Thus, multiple network ports on a node are represented at the reconfiguration framework API by a single logical module, referred to herein as a BusPort.

The following are two characteristics of the network protocol and the hyper-kernel that support reconfiguration.

First, a new logical node may be dynamically added to the system, or an old logical node may be removed. Future growth of the system (e.g., thin provisioning) may require more nodes than were originally configured at startup of the software defined server. The implication of this is that the set of logical nodes actually in use may vary over time. In one embodiment, in order to handle multiple switches, multiple ports, etc., the interconnect protocol is configured so that it separates logical node identifiers from physical layer constraints.

Second, when broadcasting hyper-kernel messages, nodes that are not operational need not receive or handle such hyper-kernel broadcasts, as this may introduce failures if they do. In some embodiments, hyper-kernel broadcast is implemented such that there is a "multicast group" that is maintained for all logical nodes that are operational, and that the hyper-kernel broadcast operations use this multicast group, rather than a total broadcast (which may result in broadcast to non-operational nodes as well).

Note that unicast messages may be sent to a logical node, whether operational or not. This capability may be used for messages needed to manage reconfiguration. In some embodiments, reconfiguration also uses broadcast to all nodes on a segment—this may be used for administration functions to determine the state of all nodes, not only the operational nodes, while the system is running.

Described above are details regarding an example implementation of a dynamic reconfiguration framework that divides the hyper-kernel into two layers, one dealing with implementation of a single scalable virtual hardware system (e.g., single scalable virtual Intel hardware system), and a lower layer that provides abstractions of Logical Modules used to implement all of the functions needed in a way that allows for dynamic reconfiguration while the software defined server continues to run.

The above described logical modules encapsulate the mechanisms of fault tolerance by supporting operation in a "degraded" state when a hardware component used in their implementation fails.

Dynamic reconfiguration of a multi-server distributed computing architecture, such as a software defined server, has been described. Hardware modules may be added, substituted, and removed from a running software defined server system transparently to the guest operating system and running workloads. Fault tolerant nodes may be removed for service when running in a degraded mode. Substitution for managed I/O devices from a running software defined server may be performed with minimal or no impact, while the guest system continues to run. Resilient storage volumes and network interfaces are migratable among nodes.

Using the techniques described herein, a system may be reconfigured while it is running, which has various benefits over existing data center solutions, for example, by enabling continuous availability while replacing and repairing modules in a degraded state.

Using such protocols, the reliability of the software defined server may be improved, as well as the ability to scale the software defined server to fit the needs of the application being run (by being more efficient/less wasteful with the utilization of computing resources).

Figure 12:
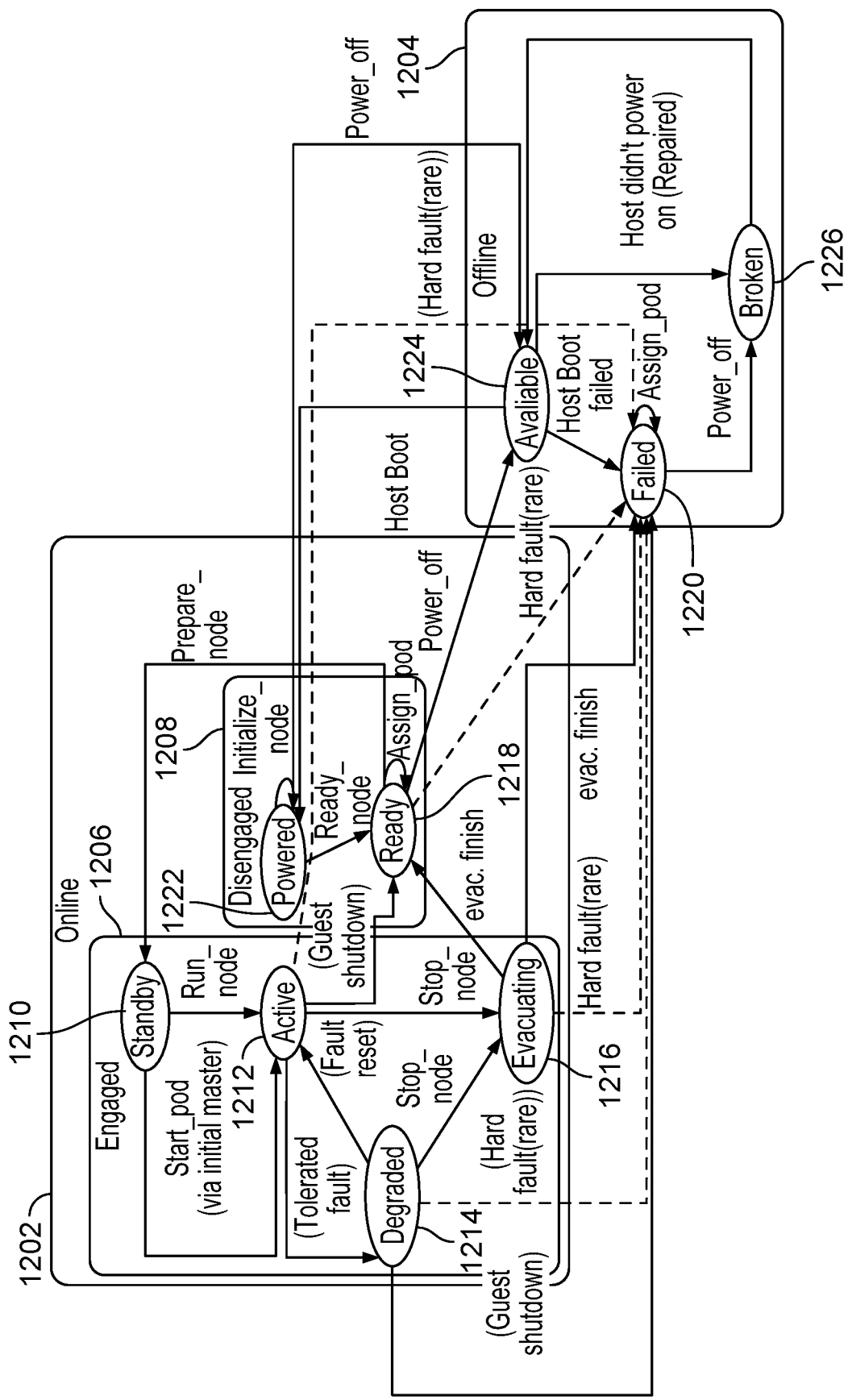
FIG. 12 illustrates an embodiment of an operation state transition diagram for a node.

FIG. 12 illustrates an embodiment of an operation state transition diagram for a physical node. In this example, a node may be either online (1202) or offline (1204).

When a node is online, it may either be engaged (1206) as part of a software defined server (also referred to herein as a "pod"), or online but disengaged (1208) from a pod.

As shown in this example, when a node is engaged with a software defined server, the node may be in either the standby state (1210), the active state (1212), the degraded state (1214), or the evacuating state (1216).

When in the standby state, the node may transition to the active state when the software defined server is started (e.g., via an initial master) or the node is run. When in the active state, the node may transition to the degraded state if a tolerated fault occurs, or may transition to the ready state (1218) in a disengaged mode when the guest is shutdown. When in the active state, the node may also transition to an evacuating state if the node is stopped (e.g., is to be removed due to thin provisioning). When in the active state, the node may also transition to a failed state (1220) of the offline mode due to a hard fault (which may be rare).

When the node is in the degraded state due to a tolerated fault, the node may transition either to the evacuating state when the node is stopped, or transition to the failed state (1220) of the offline mode due to a hard fault (which may be rare) or due to guest shutdown. From the degraded state, the node may also transition back to the active state if the fault is reset.

When the node is evacuating, the node may transition either to the ready state of the disengaged mode or the failed state of the offline mode when evacuation of virtualized resources is finished. The node may also transition from the evacuating state to the failed state of the offline mode when a hard fault occurs.

In the online but disengaged mode, the node may be in either the powered state (1222) or the ready state (1218). From the powered state, the node may transition to the ready state if the node is ready. The node may stay in the powered state if the node is initialized. The node may also transition from the powered state to the offline but available state if the node is powered off.

From the ready state, the node may transition to the standby state of the engaged/online mode when the node is prepared. The node may also stay in the ready but disengaged state when the node is assigned to a software defined server. The node may also transition from the ready state to an offline but available state (1224) when the node is powered off. The node may also transition from the ready state to a failed offline state when a hard fault occurs.

When the node is offline, it may be either in the available state (1224), the failed state (1220), or the broken state (1226). When in the offline available state, the node may be transitioned to the disengaged powered state if the host is booted. If the host boot fails, then the node is transitioned from the available state to the failed state. If the host did not power on, then the node transitions from the available state to the broken state.

In the failed state, the node may transition to the broken state if it is powered off. The node may stay in the failed state when it is assigned to a software defined server.

In the broken state, the node may transition to the available state if the node was broken but has been repaired.

Example Scenarios of Dynamic Reconfiguration of a Software Defined Server

As described above, two example scenarios in which the techniques described herein are utilized for dynamic reconfiguration of a software defined server include handling faults to hardware and thin-provisioning of computing resources. Further details regarding these two example scenarios are provided below for illustrative purposes.

Handling Hardware Faults to Physical Components

Examples of hardware faults include faults with physical components of a node, such as a cable, disk drive, processor, memory DIMM, etc.

One assumption of the failure model of the software defined server described herein is that the failures that are dealt with are faults that do not occur instantaneously. Rather, it is assumed that there are hardware mechanisms that have internal redundancy such that no function instantly stops occurring, and random noise is not created in the system. That is, as described above, failing components may continue to operate in a degraded state, during which the system may be reconfigured.

For example, many components of typical servers are designed or configured to detect early failures and provide warnings (or even slow down the system) in order to continue operating for a period to allow for the issues to be addressed, rather than simply immediately failing without warning.

As one example, memory (e.g., DRAM) in enterprise servers may include error correction coding. In this way, even as the memory fails, it continues to return correct values. The memory is also aware that it is beginning to fail (e.g., if the memory fails at some bit position, the memory chip sends a signal to another part of the system indicating that it is beginning to fail and that some action should be taken). Typically, memory chips may last for weeks in this degraded state, where generated errors may still be corrected, before they need to be fixed.

Similarly, processor chips may also fail after many processing cycles. Typically, as the processor degrades, temperatures rise. As the temperatures rise, the clock rate of the processor may be slowed down to reduce the risk of failure. While the processor may continue to operate in this degraded state (with the correct results still being computed), it will eventually fail if not remedied.

As another example, cables in systems are frequently associated with failure, due to vibration, corrosion, etc. In one embodiment, the software defined server is designed or configured such that every message has at least two paths between nodes, so that if one cable fails, it is detected and may be removed, while the system continues to run in a somewhat degraded state (without a redundant alternate path). This is an example of redundancy-based failure compensation.

In some situations, for example, if the cable is a critical part of the system, it may not be possible to reconfigure the system (and replace the failing cable) without removing the node to which the failing cable is attached. This is because after pulling a cable, guarantees cannot be made about the ability, for example, to run mission critical applications. However, using the reconfiguration techniques described herein, reconfiguration of the system, such as cable replacement can be performed while allowing such mission critical applications to continue to run. In one embodiment, if a cable failure occurs, the failure is detected by the hyper-kernel, which in response, is configured to switch traffic to the alternative redundant path.

As yet another example, disk drives or storage volumes may be set up in a redundant manner, such as in a RAID structure, such that if one particular disk drive or storage volume fails, the information is still available from other disks. This type of replication may also be performed for external storage, which may be replicated in multiple locations.

With respect to storage volumes, in addition to the reconfiguration techniques described herein, failures may also be coped with by using multipathing, in which external storages may be communicated with using multiple different cables to multiple different storage units that will logically appear, from the perspective of the hypervisor, as a single unit.

In some embodiments, an external management system, (e.g., implemented in the admin console described above) is configured to detect/monitor for the signals that indicate hardware component failures. The signals may be provided by the various per-node hyper-kernels. Each hyper-kernel may listen for failure-identifying signals, for example, by polling physical components and/or obtaining reported values from physical components.

For example, as described above with respect to memory chips, the bit error failures are detected by the hyper-kernel, with a count (or rate) of bit error failures being maintained. When, for example, the bit error count (or rate) meets or exceeds a threshold, then it is determined (by the hyper-kernel or by the external management node) that the memory chip is failing. An example involving detecting and handling failing memory chips is described below.

With respect to processor chips, the increases in processor temperatures and/or decreases in clock rate are used as an indication of the processor failing. With respect to the example of cables, if an individual cable fails, the cable failure is reported to the external management system.

The hyper-kernel may detect failures in components by accessing status information collected by a server motherboard. For example, the server motherboard may collect and/or report the performance of various hardware components attached to the motherboard (e.g., the memory chip, processor, fans, block devices, network devices, etc.). This may include telemetry data, such as temperatures, voltages, fan speeds, errors detected and corrected, etc., which are collected, for example, in memory registers that, while not seen by the guest operating system, are accessible by the hyper-kernel. In some embodiments, a per-node hyper-kernel is configured to poll the node's motherboard for such telemetry information. In other embodiments, the motherboard reports such telemetry information to the hyper-kernel. The hyper-kernel may then pass the telemetry information to the external management system (where the hyper-kernel may also perform processing on the telemetry information (e.g., summarizing, such as determining counts of events, rates of events, etc.) before it is passed to the external management system).

Upon detecting the failures/degradation of hardware componentry, recovery/remediation actions are then initiated. In one embodiment, the external management system surfaces the failures/degradations to an operator-user or administrator, notifying them of the potential failure/degraded state of componentry. The user may then initiate steps to handle/recover from the failure. In another embodiment, the external management system, in response to detecting failures/degraded performance of hardware components, programmatically/automatically initiates (e.g., according to a set of logic rules) handling/recovering from the hardware failure.

In various embodiments, recovery includes removing a failing device, or moving the failing device and placing an equivalent device in its place. As described herein, devices may be removed and replicated while the system is running. For components such as processors and memory chips that cannot be easily removed, the whole node containing the failing component may be removed and substituted with another spare node, while the removed node may have its processor/memory chips replaced offline (e.g., using the evacuation and node replacement mechanisms described above).

For illustrative purposes, an example in which a failing memory chip is detected, and reconfiguration of a software defined server is performed to address the failing memory chip, including replacing of a node containing the failing memory chip, is described below.

Typically, in an architecture such as the Intel architecture, the hardware periodically (e.g., based on a timer interrupt) reports the state of the hardware, which may be read by the hyper-kernel. For example, there may be various registers throughout the system, such as on motherboards and processors, that indicate what faults have occurred. The fault may be a fault that does not change the behavior of the processor. As one example, consider a memory fault that is detected. The detected memory fault may be recorded and stored in a register of the motherboard. In existing systems, such telemetry information that is collected on motherboards is typically not reported anywhere off of the basic register that captures the telemetry information. In one embodiment, the hyper-kernel makes use of such information to identify failing/degrading hardware devices/components.

In one embodiment, the hyper-kernel includes a monitoring process that monitors or keeps track of telemetry data and determines whether a physical device may be failing or degrading. As one example, the hyper-kernel monitors the rate of correctable memory errors, and when the rate of correctable memory errors reaches a threshold, the hyper-kernel determines that this is an indication that the memory is failing. The hyper-kernel may poll the motherboard for the telemetry data regarding the count of correctable memory errors, by, for example, accessing the registers holding the telemetry data. In another embodiment, rather than the hyper-kernel polling the hardware for the correctable error memory count, the motherboard, which is detecting the errors, instead sends a message to the hyper-kernel regarding the errors. That is, for example, the motherboard is instructed to provide telemetry data (e.g., various statistics on the counts of detected correctable memory errors) to the monitoring process of the hyper-kernel.

In one embodiment, the hyper-kernel observes the count of correctable memory errors. For example, a bank of memory may use the count to determine the rate of correctable errors on any time scale as appropriate (e.g., correctable errors per minute, per hour, etc.). In a typical computing system, the rate of correctable errors that are detected may be on the order of zero per hour or zero per week. As the system ages however, the rate of correctable errors may increase, for example, to one or two correctable errors per month. While the memory may not be completely unusable (i.e., the memory is in a degraded state) and need not be removed entirely, such information may be used by the hyper-kernel to initiate remediation actions to address the degraded component before it fails.

In one embodiment, the hyper-kernel provides obtained telemetry information to an external management node (e.g., admin node described above). For example, the hyper-kernel on a node, in response to detecting an error with the memory on that node, sends a message to the external management/administrator node (which may also be a separate management computer outside of the software defined server) over, for example, a management network. As one example, the message indicates the identity of the memory that is failing, the node that the failing memory is on, and the failure rate experienced by the memory component. Different types of messages with different failure indicators may be sent for different types of components.

Continuing with the example of failure of a memory chip, based on the error rate threshold being exceeded, remediation actions may then be taken to address the failing memory. As one example, the remediation action includes removing the node with the failing memory so that it is no longer functioning as part of the software defined server. The removed node may then be replaced with a different node providing replacement physical resources.

The component/node replacement process may be started or initiated in a variety of manners. As one example, the external management node surfaces the failing of the component to an operator or administrator of the software defined server (e.g., by displaying or sending a notification alert to the operator), for example, notifying the operator of the issue and that the error rate for a particular bank of memory has exceeded a threshold. The operator may then initiate the replacement workflow.

In another embodiment, the management node is programmed with rules that automatically trigger remediation actions in response to detecting that the memory is failing or in a degraded state (because its error rate has exceeded a threshold).

Thus, a request may be made, either manually or automatically, to initiate the process of reconfiguring the software defined server by removing the node with the failing/degraded memory.

In this example, as part of the remediation process, a spare node (e.g., that is in the available state) is activated by the external management node. This may be performed to ensure that there is some unused memory in the software defined server, which may be needed since the node with the failing memory is to be removed.

In some embodiments, to maintain a high level of availability, each pool of software defined servers is associated with a spare node that may be added quickly to any of the software defined servers in the pool. This spare node may not already be connected to any particular software defined server, but is in a state where it is ready to connect to any software defined server in the pool.

In this example, the external management node/controller activates the spare node by sending a message to the spare node, which is then brought into the active state. The activated spare node is then bound to the software defined server from which the node including the failing memory is to be removed. At this point, the added node is not running, but is in tight communication with the software defined server.

The management node then puts the spare node in the running state. In this state, all of the physical resources (e.g., physical processors, memory, block storage, I/O devices, etc.) are made known to the other per-node hyper-kernels that are on the other nodes of the software defined server. That is, all of the other hyper-kernels of the software defined server are made aware of the new node that has been added. Once all of the other hyper-kernels are aware of the added spare node, the newly added node is flipped into the running state, in which it becomes an integrated part of the software defined server, where virtualized resources may be migrated to and from the newly added node.

For example, virtual processors and pages of guest virtual memory may be migrated to the spare node. As another example, I/O operations may be served by whichever I/O components of the new node are capable of performing the operation (e.g., when the new node includes a network adapter). This may include sending and receiving packets as part of a virtual network adapter that spans two nodes, facilitating communication with network attached storage, storage area networks, NVMe fabrics, etc.

In some embodiments, upon placing the spare node in the running state, the management node also communicates to the other hyper-kernels that the spare node is now available for migration of resources. The hyper-kernel of the added node may also send the message.

Now that the spare node has been added and integrated as part of the software defined server, there are sufficient physical memory resources in the software defined server to hold all of the memory that the software defined server requires (so that no piece of guest memory will not have a place in the physical memory). The failing node (with the failing memory) is then removed and shut down.

As part of the removal of the system, an evacuation process, as described above, is performed, in which the failing server node is evacuated of all virtual resources being implemented on the failing node being evacuated. During the evacuation process, the virtual resources on the failing node are migrated to the other nodes of the software defined server. While the replacement physical resources of the new node are now available, the spare node is not specifically used to hold the virtualized resources of the failing node. That is, when removing the virtual resources of the failing node, the virtual resources may migrate to any other node in the software defined server, and not specifically to the newly added node. In some embodiments, where the virtual resources migrate is determined according to the cost functions described above. In one embodiment, the cost functions are adapted to take into account node states and the evacuation process, where, for example, the cost functions include an additional factor term that takes into account the condition of whether a node is being evacuated (and therefore virtual resources cannot be migrated to the node—migration to the evacuated node is blocked). This ensures that virtualized resources are not sent to any node that is being evacuated.

In one embodiment, the ability to reconfigure the software defined server without shutting the entire system down allows for optimizations that have been learned over the course of the running of the software defined server to be maintained. For example, the hyper-kernel includes a machine learning layer that is responsible for learning the needs of the application. The hyper-kernel learns application behavior by observing the relationships between virtual resources. For example, the hyper-kernel learns the memory and CPU requirements of the application and establishes relationships between these resources.

The hyper-kernel updates these relationships continuously while the applications are running. The machine learning layer then maps virtual resources to hardware across nodes. When virtual resources are related, the hyper-kernel attempts to map them to the same node to avoid unnecessary migration across nodes (and reduce stalls). Thus, the hyper-kernel monitors and learns the performance of the application that is running (e.g., by monitoring stalls and the resources that are involved in the stalls), and adapts/optimizes the placement of the resources to improve locality (temporally and/or spatially), thereby reducing stalling events and improving the performance of the software defined server. Thus, the hyper-kernel, through continuous learning and introspection, optimizes how resources are distributed across the system (even if there are multiple applications simultaneously). This self-optimization is performed efficiently and dynamically, allowing the system to automatically adapt to changes in application behavior. By allowing the software defined server to be reconfigured without shutting the system down, the optimizations that have been determined over the course of the running of the system are not lost and need not be re-learned, which is another example of a benefit of the reconfiguration mechanism described herein.

While the virtual resources are migrated out of the failing node, the other nodes in the software defined server are also instructed to not migrate any virtual resources to the failing node. This synchronizes the nodes in terms of migration of resources during the evacuation process.

As described above, there are various types of virtualized resources that may be on a particular node at a particular time. These virtualized resources are to be evacuated from the failing node and include pages of guest physical memory, virtual CPUs, virtual I/O devices, etc. In one embodiment, each type of virtual resource is associated with a corresponding evacuation protocol that defines or specifies how the particular type of resource is evacuated.

The evacuation protocols for the different types of virtualized resources may be executed in a specific order. One example of such an execution order is as follows.

First, virtual CPUs that happened to be running on the failing node are instructed to migrate to other nodes. This includes stopping the virtual CPUs. Each physical CPU is sent a message instructing the physical CPU to send any VCPUs that it is implementing to another node. This includes creating a continuation, as described above. What node the VCPU is sent to is determined according to the cost functions described above.

As described above, the VCPUs being migrated may not necessarily be migrated to the spare node that was added. The node to which a VCPU is migrated depends on which node the cost functions determine is the best (e.g., from a performance perspective), which may also be based on the system's machine learning and performance self-optimization described above. As one example, if a VCPU has an affinity with pages on a particular node, the VCPU is preferentially moved to that node. There may not be a preference for sending a VCPU to a node that is currently empty of virtualized resources (as the spare node would be when it is brought into the software defined server). As the VCPUs move to other nodes, these other nodes may begin to become overloaded, and the cost functions (as executed by the hyper-kernels on those nodes) may decide, in response to the overloading, to send the VCPU to nodes that are unloaded, which would include the newly added node.

As described above, the other nodes in the software defined server are configured such that they do not send any virtualized resources to the failing node that is being evacuated. Preventing the migration of virtualized resources to failing nodes may be implemented via the cost functions. For example, the cost functions are adapted to include an additional factor or term that takes into account the evacuation status of the node that is being considered as the destination for the resource migration. As one example, if the destination node is determined to be a failing node that is being evacuated, then the cost to send the virtualized resource to that node is made very high such as to prevent that option from being selected. As another example, resource migration to the node is made impossible based on the condition of evacuation, and any strategies for sending virtualized resources to such a node are not evaluated.

After all of the virtual CPUs on the failing node are evacuated, the hyper-kernel on the failing node next initiates the process of evacuating virtualized I/O from the failing node. In one embodiment, the virtualized I/O devices are evacuated one by one from the failing node.

Each virtual I/O device is running in a process on the hyper-kernel of the node that is running or implementing the virtualized I/O device. In between I/O operations, the virtual I/O device checks whether it is to be evacuated. If the virtualized I/O device needs to evacuate itself, it stops performing I/O, and sends itself as a process to another node that has the hardware resources to perform the operation or task. That is, I/O devices are migrated between nodes that can perform the same I/O job.

In some embodiments, physical nodes that have actual physical I/O devices have a redundant path to do the same I/O elsewhere in the system. For example, the software defined server is configured such that there are at least two nodes that have every capability of what any particular I/O device does. In this way, if a node that has a physical I/O device on it fails, high availability is achieved since there is an alternative to that I/O device in the software defined server.

This alternative may be provided by having another I/O device of the same type. The alternative may also be provided by a different kind of I/O device. For example, consider a block storage I/O device. A storage volume may be accessible through not only a direct hardware channel, but also through a network path to a controller that also talks to the same disk. In this way, the logical I/O device may be moved, for example, from a Small Computer System Interface (SCSI) connection over to a Local Area Network (LAN) connection, and vice versa.

Thus, redundancy is provided with multiple I/O devices (which may be of different types) that have the capability to perform required work. As another example, for a network connected to the same set of switches, multiple paths are provided to perform I/O operations.

In one embodiment, an I/O device may be moved through a different physical I/O volume on another node, for example, by copying all of the contents of the I/O device to the destination node.

As described above, when, for example, substituting one physical NIC port for another, the MAC address may be reassigned. Many network devices have the ability to reassign or change their MAC address, a process referred to as "masquerading." Consider, for example, an Ethernet device. In order to move the Ethernet device from one node to another in a transparent manner, the new Ethernet device takes on the same name as the old Ethernet device. In the Ethernet protocol, two devices that have the same MAC address will both receive messages addressed to that MAC address (although it is possible that only one will receive the message). The old Ethernet device is then dropped.

As an alternative, rather than having two devices both have the same MAC address for an overlapping period of time, the old device is dropped and the new device is given the old device's MAC address. This may cause a network frame or packet to be temporarily lost because there may be, momentarily, no receiver for that MAC address. However, this typically does not cause issues, because the sender will retransmit the Ethernet packet.

In addition to/instead of MAC address masquerading, the Internet Protocol (IP) address of the Ethernet device may also be moved. For example, when moving the IP address, negotiation with routers in the software defined server is part of the migration process, where a router is notified of the change in IP address for the network device.

The above described technique of masquerading the identity of a network device and changing the name of a physical piece of hardware (e.g., moving namespaces between physical pieces of hardware) may also be adapted for block storage devices. For example, analogous to network devices, a block device may have various names/identifiers, such as a /dev devices name, a Universally Unique Identifier (UUID), the name a user provides the block device (as specified in the name field), etc. When virtualized block storage devices are presented to the guest operating system, and the guest operating system requests the name of the device, any name may be provided or returned, such as the name of the physical hard disk drive mapped to the virtual hard disk.

As one example of evacuating an I/O device, suppose that a virtual network adapter is to be evacuated from a node. In one embodiment, the virtual network adapter is evacuated by moving the virtual network adapter code and its tables to a node that has a different physical network adapter (that may be of a different type) that can provide the same type of connectivity and will be assigned the same name as the old adapter.

One example of a difference between a network device and a storage device is that the network device does not have state associated with it, while the storage device does—the content data stored on the storage device.

With respect to migrating a block storage I/O device, in some embodiments, the storage device is implemented outside of the software defined server, across a network, as part of a remote file system. In such a scenario, migrating the storage device becomes migrating the network device, and the storage device does not need to be evacuated. The storage device outside of the system may be made reliable by other mechanisms. For example, multiple redundant paths may be provided to the external storage.

If, however, the I/O physical block storage devices are attached to a machine node, then in one embodiment, and as described above, evacuation to another block storage device is performed, which may include mirroring the contents of the original storage device. That is, a mirror is constructed on the new node, where writes are performed to both nodes to generate two identical copies. A switch is then made to the new hard disk so that writes/reads are directed to the new hard disk drive. As described above, in one embodiment, the mirroring is performed by using RAID replication. The RAID replication process may be performed on drives that are on different nodes.

Thus, various techniques may be used to make disk drives more redundant (e.g., RAID mirroring or having partial copies such as in a RAID 5 or RAID 10 configuration). In this way, even if a disk in the RAID array is removed/disconnected, the array will continue to operate. In some embodiments, if such a redundancy scheme is implemented, then evacuation of block storage is not required (as array contents may be reconstructed).

Thus, as described above, evacuating I/O devices that are virtualized includes moving the state of the I/O device (e.g., any long term state) to a new device, and redirecting the manner in which prior requests are handled to the new node (e.g., using device identity masquerading/reassignment).

For some devices, such as serial ports, which are a single physical wire without redundancy, rather than using such a physical serial port, a virtual serial port is used, such as a Secure Shell (SSH) connection over a network. While the guest operating system may communicate with the virtual serial port as if it were a real serial port, executing register writes, etc., the hyper-kernel is configured to trap the writes and interpret them into operations to emulate the serial port by communicating to a network broadband connection.

After virtualized I/O devices have been evacuated, the hyper-kernel on the failing node then begins the process of evacuating guest physical memory from the failing node. In one embodiment, virtualized I/O devices are evacuated before guest memory because if there are any I/O devices on the failing node, similar to VCPUs, the act of running the virtualized I/O has a tendency to pull memory toward the virtualized I/O device. Thus, resources that pull memory pages or need to access memory pages are evacuated off the failing node before the pages of memory are evacuated from the failing node.

One example of evacuating the guest pages of memory is as follows. The hyper-kernel on the failing node goes through all of the memory pages on the node, and using, for example, the cost functions described above, migrates the pages to other nodes in the software defined server, which are whatever nodes the cost functions determine to be the next best place for the page of memory (which is not necessarily the new spare node).

As described in conjunction with the evacuation of VCPUs, this page migration may cause the memory level of some nodes to become critical (where the node is running out of memory), which may cause such nodes to invoke their cost functions and decide which pages to migrate, which may go to another node with excess memory capacity, such as the newly added and empty spare node.

Upon completion of all virtualized resources off of the failing node, the node is then placed in quarantine. The hyper-kernel on the evacuated/failing node then informs or otherwise notifies every other hyper-kernel in the software defined server that the failing node is leaving the software defined server. After receiving an acknowledgment response back from each of the other per-node hyper-kernels, the failing node that is leaving then changes its state. In this example, because the node is failing, it is placed in the failed state after evacuating its virtual resources, and thus cannot be added back to the software defined server. In some embodiments, while in the failed state, and separated from the software defined server, the failing node may still be allowed to run with a hyper-kernel, where the hyper-kernel may provide diagnostic information to the external management node, have tests performed on the failing node, etc., prior to being removed.

As described above, the evacuation mechanism utilizes the migration capabilities of the software defined server, respecting the cost function algorithms to decide where resources are migrated. By respecting the cost functions, existing machine learning optimizations (such as those described above) that have been learned over the course of running the system may be maintained.

Thus, the performance of the system is maintained, since the reconfiguration process is performed without restarting the operating system. If the system were brought down and brought back up, this would require relearning of the performance optimizations that had been previously learned. Thus, using the techniques described herein, performance optimizations do not need to be relearned. As the system is able to continue to run without disruption, performance optimizations may continue to be learned even through reconfiguration of the underlying hardware of the system.

While an example of node removal due to a memory fault was described above for illustrative purposes, the reconfiguration process described above may be variously adapted to accommodate reconfiguration in response to detecting other types of faults as well. As described above, other faults that may be detected and addressed include temperature rises due to fan failures, increases in error rates on network connections (e.g., due to a failing cable), failures of storage devices in a rack that cannot be removed and must be replaced, etc. Regardless of the type of detected error, the mechanism described above, including evacuation of virtualized resources, may be used to remove a node with a failing component from the software defined server.

As described above, some nodes in the software defined server may have specialized purposes. For example, one node may be designated a master node because it is the source of the system wide virtual hardware clock, where all other nodes are slave hardware clocks. A node may also be a master node that has master knowledge of what nodes are in the system. If such a master node is failing and is to be removed, then in one embodiment, the master designation of the failing node is moved to another node. This transfer may include a handshake protocol with another node, where the previous master node tells the other node that it is now the master, and the new node acknowledges that it will become the master. Resources are then evacuated from the failing node, as described above.

In other embodiments, distributed protocols are implemented such that there is no master clock node or master node that has master information about the nodes in the software defined server.

Preventative Maintenance Plans

In some embodiments, using the reconfiguration mechanism described herein, preventative maintenance programs may also be established to improve system reliability. For example, as described above, systems, when new, typically work well, but suffer from performance degradation as the system becomes older.

As one example of a preventative maintenance program, swapping of server nodes may be scheduled on a time driven basis (e.g., every year). Using the dynamic reconfiguration techniques described herein, such server nodes and their components may be swapped out while the system is running, maintaining high availability of the system. This ability to reconfigure the system while it continues to run and provide such high availability without any downtime is an improvement to existing data centers. Typically, taking down the operating system and application that is running in a large data system may take hours to even days. There would also be the time needed to perform repairs and then restart the system. Using the techniques described herein, the system does not need to be taken down. Rather, one part of the system (e.g., a server node) is taken down and removed (e.g., from a server rack), and replaced if needed (e.g., to replace physical host componentry used to implement virtualized resources), all while the system remains up and running.

Figure 13:
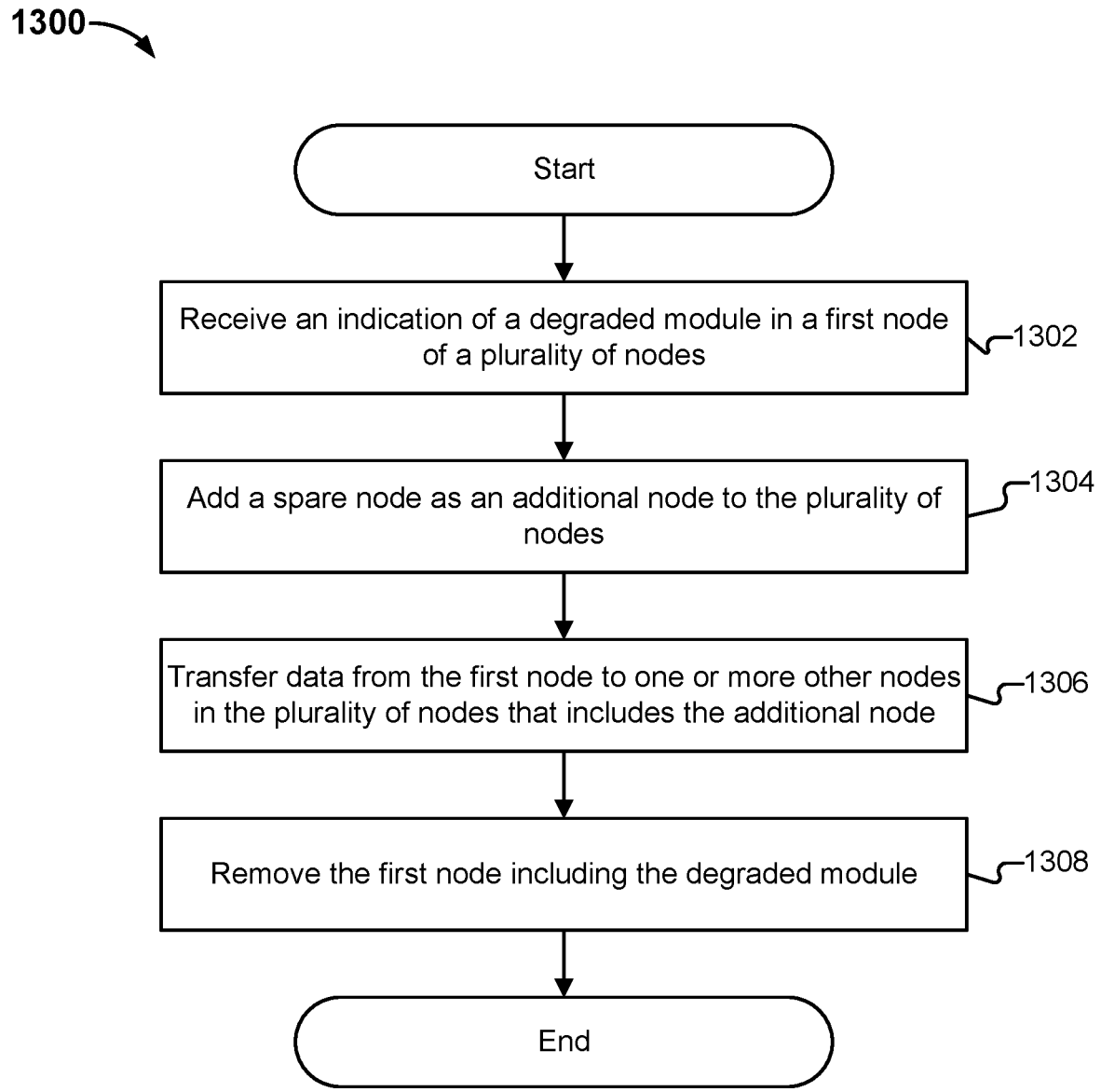
FIG. 13 is a flow diagram illustrating an embodiment of a process for removing a failing node.

FIG. 13 is a flow diagram illustrating an embodiment of a process for removing a failing node. In some embodiments, process 1300 is executed by a software defined server. The process begins at 1302 when an indication is received of a degraded module in a first node of a plurality of nodes that form the software defined server. At 1304, a spare node is added as an additional node to the plurality of nodes. At 1306, data is transferred (e.g., evacuated) from the first node to one or more other nodes in the plurality of nodes that include the additional node. At 1308, the first node including the degraded module is removed.

Thus, in one embodiment, a degraded module is dealt with as follows. A spare node is added. Data is transferred from the failing (degraded) node to one or more other nodes in the software defined server. The failing node is removed and repaired/replaced. As another example, the state of a degraded I/O module is moved to an I/O module on another node, where the failing node is replaced and repaired.

One benefit of this fault tolerance mechanism is that with available spare nodes, the hardware of the software defined server can "fail in place," which is important to datacenter operations so that scheduling repairs may be batched.

Thin Provisioning

As used herein, thin provisioning refers to the ability to dynamically and transparently adjust the size of a computing system (such as the software defined server) as required by the workloads/jobs/applications.

Computers include resources such as processors, memory, and I/O functions such as disk drives and network connections. Applications are run on these computers which utilize these resources. In some cases, the application may require or try to use more processors or memory than is present in the computer. One example of this is when an application addresses more RAM than is present in the computer. At this point, pages of memory which are not actively being used are moved from RAM to storage (e.g., hard disk drive HDD or solid-state drive SSD) and saved to make room for other pages of memory that have been saved in the storage media to be retrieved and brought into RAM. This "paging" fools the application into believing that it has more RAM than is actually physically present.

Similar mechanisms exist for processors and I/O functions to be virtualized and thus potentially be oversubscribed on the computer (i.e., available hardware). As an example, a virtual processor may be saved and thus idled while another processor is (re-)started utilizing the physical processors which are available. This requires running instructions which save the processor state, saving that state in memory, and then loading the new processor state which will then be resumed.

The challenge with these approaches is that they are very slow in comparison to having sufficient resources (e.g., sufficient processors, memory, and I/O). Being able to run applications with as many cores, memory, and I/O as needed allows applications to run significantly faster, with orders of magnitude increased in performance in comparison to a constrained environment.

These challenges are especially compounded due to the rate at which digital data continues to grow, where data centers must handle ever larger amounts of data. Typically, however, it is difficult for customers, when specifying data centers, to determine an appropriate size of their data center. It is also difficult for application developers to understand the size of the compute environment needed for their application, which may change over time. In existing data systems, the application developers may over-specify the amount of resources (e.g., processor cores and/or memory) needed to run the application, where the data centers may make their own determinations on the needed amount of resources in an attempt to keep resource utilization high and control costs.

The hyper-kernel described herein provides an improvement to existing data centers by breaking the traditional constraint of a computer by allowing computers of larger sizes to be created by combining multiple computers into a single, virtual software-defined computer. The hyper-kernel technology allows these systems to be allocated at boot-up time to create a virtual computer which aggregates the physical resources (cores, memory, I/O, etc.) of the individual computers and presents them to an operating system as a large virtual computer (or virtual machine). The hyper-kernel allows operating systems and applications to run without modification. In one embodiment, when the software defined server described herein runs, it will utilize the sources of the first computer, until a certain threshold of utilization is reached. At that point, the resources of the next computer will begin to be utilized until the threshold is reached, and then the next computer will begin to be used, and so on.

Building on this capability, the computer no longer needs to be of a pre-determined size. Rather, the computer is dynamically scalable, where resources may be dynamically added (thereby growing the system) as is required by the workload/application. This dynamic scalability has a benefit in that when the application is developed, there is no longer a constraint based on the available sizes of computers. In contrast to existing data centers, when a workload is run, it is no longer necessary to undergo a major sizing effort to determine the appropriate size of computer to purchase or deploy in order to run the application. Instead, using the techniques described herein, the software defined server may size itself to the workload/application. If more resources are needed, then the resources may be transparently added out of, for example, a pool of unused computers. When resources of a computer are no longer being used or not needed, a computer in the cluster may be transparently withdrawn and returned to the pool. This process of transparently adding and removing computers from the software defined server is referred to herein as "thin-provisioning," where the size of the computer (e.g., cores, memory, I/O) is not real, but rather a view of what the computer may become if the need for a computer of that size is needed. In effect, the amount of resources that a user writing or running an application/job believes to be available needs to match to the actual amount of physical resources of the software defined server. When resources are needed, the software defined server may scale/grow so that it continues to run optimally. Such adjustments may be performed dynamically with fast response rates (e.g., on the order of microseconds), and/or over an extended period of time as the size of a dataset/application grows (e.g., over days, weeks, months, years, etc.).

Further, higher priority jobs/applications may "steal" resources from lower priority applications. For example, applications may be designated as "mission critical," "best effort," or "as available."

The dynamic scaling of physical host resource capacity and resizable thin provisioning of a computing system, as described herein, may be requested either manually (e.g., by an operator of the system) or automatically (e.g., based on automatic monitoring of the load of the servers in the system).

Scaling the System Down

One benefit of the ability to remove physical host resources while the system is running is an improvement to power management. For example, power consumption of large systems that are not being fully utilized may be significant. In one embodiment, if it is determined that the load of the system is becoming relatively light (e.g., that the resource load of the system falls below a threshold), some components of the system (e.g., a node in the software defined server) may be removed (e.g., turned off or placed in a lower power state) from the software defined server, or used for another application (e.g., added to another software defined server that needs increased physical host resources).

One example of a process for removing a node from a software defined server is as follows. A request to remove a node is received. In one embodiment, the request is made manually, for example, by an operator of the software defined server, who determines that the physical host resources of the software defined server are being under-utilized (and the nodes are under-loaded). As another example, the administrator/external management node of the software defined server monitors the load on the various nodes, and in response to determining that the physical host resources are underloaded, automatically initiates or requests the removal of a node. One example of load monitoring is monitoring physical CPU time spent in the HLT state, which, in one embodiment, is calculated by a cumulative sum of clock differences before and after the HLT or MWAIT instruction (or by performance counters in advanced architectures such as Intel Xeon processors). As another example of load monitoring, non-dormant virtual memory pages as a percentage of the memory available to the software defined server is also monitored.

A node is then selected for removal from the software defined server. In one embodiment, what server to remove is based on determining a cost of removing the server. As one example, the cost of removing a node depends on how much system memory must be moved off of that node. So, for example, it may be preferable to remove the node that has the least amount of memory, if performance is the primary criterion. However, the node to be removed may also be specifically selected because it is due for preventative maintenance or is showing signs of degradation. Multiple criteria may be involved in the decision.

The node to be removed is then evacuated of any virtualized resources (e.g., virtualized processors, guest virtual memory, I/O devices, etc.) that the node is implementing.

Example details regarding virtual resource evacuation from a node are described above. Similarly to as described above with respect to the process for removing failing nodes, when scaling down physical host resources, the other hyper-kernels in the software defined server are notified of the status of the node being removed as a node being evacuated. Based on this status, virtualized resources will no longer be sent to the node being evacuated (migration of resources to the node being removed is blocked).

Upon evacuating the virtualized resources of the node being removed, the hyper-kernel of the leaving node then communicates to the other per-node hyper-kernels that the node is leaving. After the leaving node receives responses from the other nodes acknowledging the leaving of the node, the leaving node is then placed into the active state, where it may act, for example, as a hot spare for the software defined server or other software defined servers (this is in contrast to going into the failed state, as described in the case of handling hardware faults, in which a node is removed in order to be fixed).

Scaling the System Up

The ability to add physical host resources to the software defined server allows for improvements to the performance of the system to be made as needed, without disrupting the application or operating system that is running.

For example, when initializing a software defined server, an operator or user might not know how large of a system that they need. Using the techniques described herein, the user may start with a small software defined server, and then scale up the system if it is determined that additional hardware resources are needed (e.g., because the user needs to process more data than was originally anticipated). Thus, rather than having to build a system to a certain size in advance, the user may start out with a small system and scale up as needed, all without having to bring down the system and disrupting the application.

The following is an example scenario in which the memory of a software defined server is dynamically scaled to the size of the workload/application. Suppose, for example, that a retailer is utilizing a software defined server to perform real-time retail analytics over their stores. When the retailer first provisioned the software defined server, the retailer had three stores, and thus provisioned the software defined server with enough memory to process data for the three stores. In this example, suppose that the software defined server was initially provisioned with three server nodes, each with 1 terabyte (TB) of memory, for a total of 3 TB of memory.

Now suppose that, at a later time, the retailer has built a new store. Now, retail analytics must be performed on a larger data set that includes the data from the new store. In order to accommodate the additional data, it is determined that the data requirements for analyzing the data have changed from the initially provisioned 3 TB of memory to 4 TB of memory. However, the retailer does not want to disrupt the software defined server (e.g., bring it down) in order to add more resources, as this would disrupt other applications and related mechanisms that may be running on the software defined server, such as supply chain and revenue forecast workloads.

Using the dynamic reconfiguration mechanism described herein, an additional server node with an additional terabyte of memory to handle the increase in data from the new store may be added to the software defined server, without disrupting any existing applications running on the software defined server.

The process for adding an additional server node with additional memory to the software defined server may be initiated manually. For example, an operator of the software defined server may observe that when the data for the new store is being analyzed, the memory utilization of the software defined server is high, indicating that there is insufficient physical memory to process the new data. The operator may then manually request that additional memory (encapsulated in a server node) be added to the software defined server.

The process for adding an additional server node with additional memory to the software defined server may also be initiated automatically/programmatically. For example, an external management system is configured to track the resource utilization of the software defined server. If the utilization (e.g., memory level) becomes high (e.g., meeting or exceeding a critical memory level threshold), then this is an indication that the software defined server is being stressed. An operator may be notified of the memory level threshold being crossed, where the operator may then manually request to add a server node, as described above. In other embodiments, the external management node is configured with logic rules to automatically request an additional server with additional physical host resources (e.g., memory in this example) in response to detection of the resource utilization meeting or exceeding the threshold.

In this example, in response to a request to add a new node to the software defined server, the external management system selects a spare node for addition to the software defined server, transitions it to the active state, binds the spare node to the software defined server, and notifies the hyper-kernels of the other nodes of the software defined server of the addition of the new node, similarly to the process described above with respect to adding a spare node when handling hardware faults. (However, in contrast to the replacement scenario described above, in this example, when adding a server, no servers are quarantined and evacuated).

The notification of the addition/availability of the new server node may be performed through the external management server/administration node, or by the new node's hyper-kernel sending messages to other nodes. This allows the other nodes to be aware of the existence of the new node and its availability to host virtualized resources using its physical resources.

With the server node and the hyper-kernels of the other nodes notified of the addition of the new server node, the physical resources of the new node may then be utilized. For example, virtualized resources may be migrated to the new server. As one example, the cost functions used to determine the distribution of resources may now determine that virtualized resources should be migrated to the new node. If, for example, one node has reached its utilization threshold, then evaluation of the cost functions by the hyper-kernel on the high utilization node may determine that work should be moved to an underloaded node, such as the newly added node (where virtualized resources do not necessarily need to be migrated to the new server node, and the cost functions of the hyper-kernels automatically determine the optimal distribution of virtualized resources).

In some embodiments, with the change in physical host resources of the software defined server (whether scaling up or down), the virtual resources presented to the guest operating system may also be changed. For example, if expanding or contracting the physical memory of the software defined server, then the address space presented to the guest operating system may also be made larger and smaller (by adding to or deleting from the amount of memory the guest operating system believes that it has available to it). Similarly, the number of guest virtual CPUs may also become larger or smaller as the result of adding or reducing capacity (e.g., by adding a server with additional processor cores).

For example, hardware architectures and operating systems allow for the ability to add or remove physical resources (i.e., hot-plugging). The hyper-kernel invokes or otherwise leverages these mechanisms to present additional virtualized resources to the guest operating system (where virtual resources are "hot-plugged" to the virtual machine or server that the guest operating system believes that it is running on).

The performance of applications running on the software defined server may also be improved even without presenting additional virtualized resources to the guest operating system. For example, with respect to virtual CPUs, the distributed hyper-kernel of the software defined server may present more guest virtual processors to the operating system than there are actual physical processors across the nodes of the software defined server (i.e., VCPUs may be overcommitted when initializing the software defined server). As one example, the guest operating system may be presented with 200 virtual processors, when in actuality, there may be only 100 physical processors (or hyper-threads). The hyper-kernel is configured to multiplex the 200 VCPUs among the 100 physical CPUs (assuming that the guest operating system is using all 200 VCPUs). Adding additional physical processors (without increasing the number of VCPUs presented to the guest operating system) improves the performance of the software defined server, as the additional processors allow VCPUs to be concentrated nearer to the memory they need—that is, the workload may be refactored based on the addition of physical resources.

With respect to adding additional physical memory, the software defined server may be provided with more host physical memory than is needed to hold the guest physical memory (or the amount of memory that is presented to the guest). In many analytic loads, most data is not written after the first time it is placed in memory. In a distributed system such as the software defined server, the memory is scattered across nodes, and to avoid processors having to migrate from node to node to access the information, replication of read-only data to other nodes is performed so that processors may locally have a valid copy of the memory they need.

Increasing the amount of actual physical memory while presenting less to the guest (referred to as "under-committing" of physical memory) allows for more replication of memory pages, increasing the ability of the software defined server to run more processes in parallel and reduce access times. That is, the replication of read-only pages will fill the additional physical memory. As one example suppose that there is 1 TB of memory presented to the guest operating system, but there is physically 5 TB of actual physical memory across the nodes of the software defined server. The hyper-kernel will place copies of all pages that are read-only on all of the nodes, making use of the 5 TB of memory to reduce access times (as the VCPUs would have access to the memory they need, regardless of which node they are currently being implemented on, since the added physical memory is used to ensure that each node has a copy of a page).

As a note, while VCPUs may be overcommitted and multiplexed on physical CPUs (more VCPUs than physical CPUs), the amount of memory presented to the guest should not exceed the actual amount of physical host memory. This is because if a guest is told that it has a page of memory, then that memory should be addressable. That is, if the guest attempts to store a page in memory, there should be at least one place in the actual physical memory for it.

Thus, as described above, even if additional physical memory is not presented to the guest operating system, performance scalability may be achieved for certain types of workloads by increasing the physical host resources.

Thin provisioning of servers has been described. Workloads may become different in size than originally planned for. Using the dynamic reconfiguration techniques described herein, capacity may be efficiently added/removed to a software defined server, without an outage. This allows the system to scale to the size of the problem, rather than having the problem be scaled to the size of the system. If the guest operating system supports dynamic memory removal and dynamic CPU removal, the system may be downsized in capacity while running with a dead node.

The thin provisioning techniques described herein bring about various improvements to existing data center solutions, such as by improving the performance of the system, as well as providing more efficient utilization of resources as compared to existing data center solutions. The ability to thin-provision systems also provides financial savings to data center customers, as they need pay only for the amount of servers/physical resources they need, and can increase/decrease the size of their system dynamically.

Removing Nodes

In some embodiments, removing a logical node includes relocating all logical modules elsewhere and evacuating all virtual resources from the logical node being removed. The process for removing a node may be performed as part of handling a fault to a physical component (e.g., removing a degraded node), thin-provisioning down a software defined server (e.g., removing a node from an under-utilized system), etc.

Figure 14:
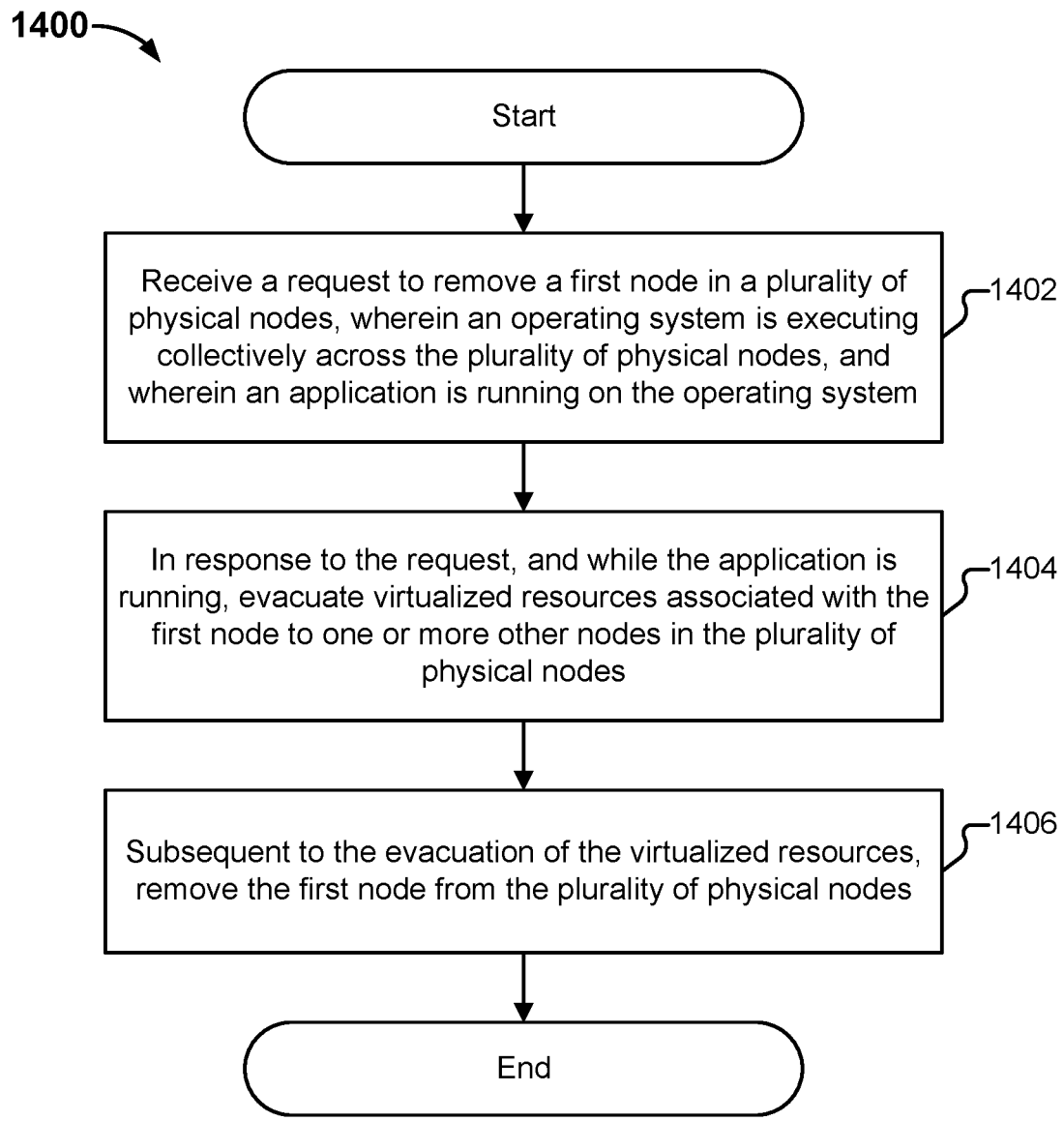
FIG. 14 is a flow diagram illustrating an embodiment of a process of removing a node from a multi-server distributed computing architecture.

FIG. 14 is a flow diagram illustrating an embodiment of a process of removing a node from a multi-server distributed computing architecture. As one example, the multi-server distributed computing architecture includes multiple physical nodes, where an operating system is executing collectively across the physical nodes, and where an application is running on the operating system. In some embodiments, process 1400 is executed by a distributed hyper-kernel. The process begins at 1402 when a request is received to remove a first node in the plurality of physical nodes. At 1404, in response to the request, and while the application is running, virtualized resources associated with the first node are evacuated to one or more other nodes in the plurality of physical nodes. At 1406, subsequent to the evacuation of the virtualized resources, the first node is removed from the plurality of physical nodes.

Adding Nodes

In some embodiments, adding a logical node includes relocating logical modules to include components on the new node as needed, and allowing virtual resources to move to and from the new node. The process for adding a node may be performed as part of handling a fault to a physical component (e.g., adding a spare node), thin-provisioning up a software defined server (e.g., adding an additional node to a loaded system), etc.

Figure 15:
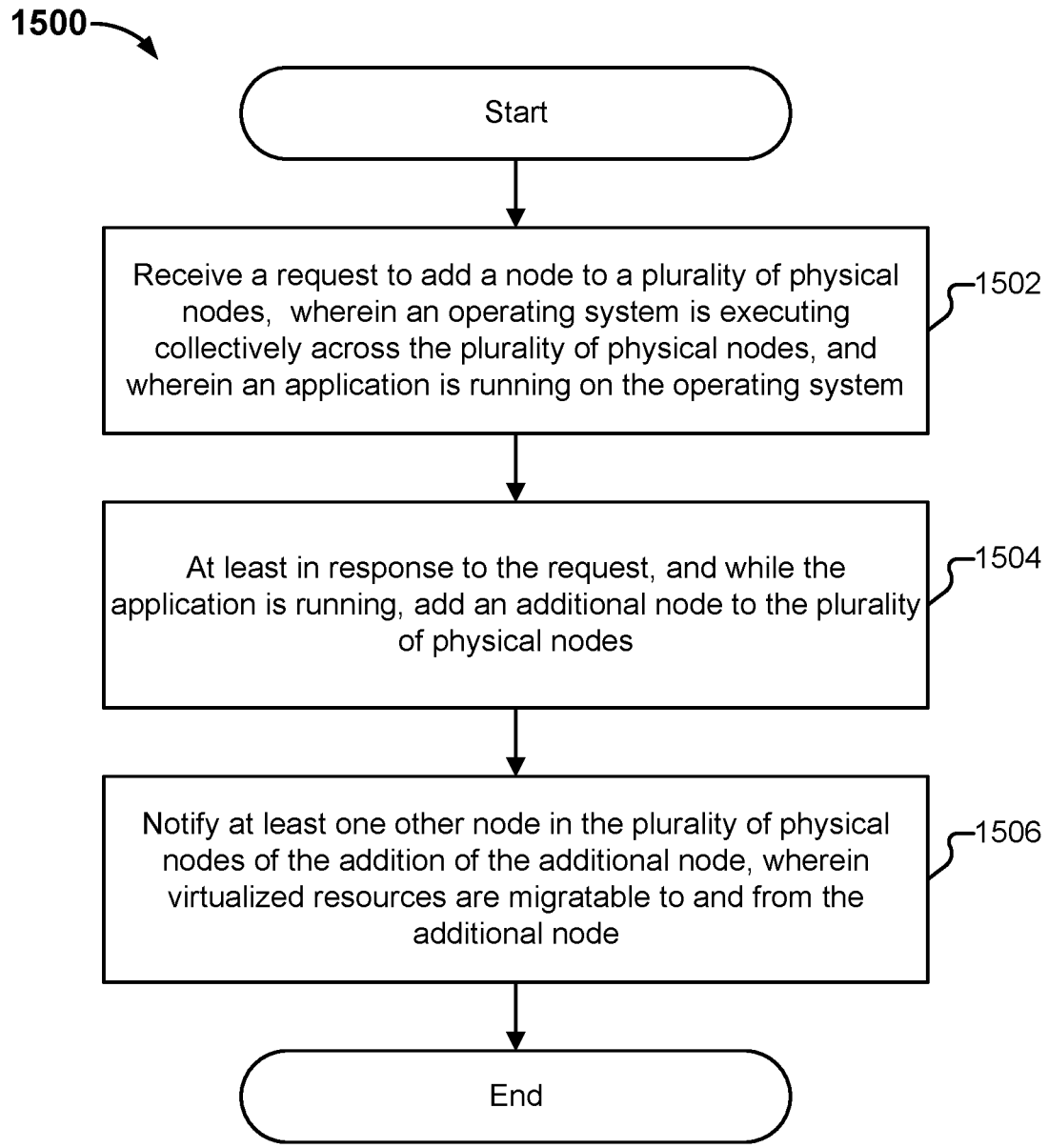
FIG. 15 is a flow diagram illustrating an embodiment of a process for adding a node to a multi-server distributed computing architecture.

FIG. 15 is a flow diagram illustrating an embodiment of a process for adding a node to a multi-server distributed computing architecture. As one example, the multi-server distributed computing architecture includes multiple physical nodes, where an operating system is executing collectively across the physical nodes, and where an application is running on the operating system. In some embodiments, process 1500 is executed by a distributed hyper-kernel. The process begins at 1502 when a request is received to add a node to the plurality of physical nodes. At 1504, at least in response to the request, and while the application is running, an additional node is added to the plurality of physical nodes. At 1506, at least one other node in the plurality of physical nodes is notified of the addition of the additional node. Virtualized resources are migratable to and from the additional node.

Dynamic adaptive reconfiguration of resilient logical modules in a software defined server has been described. Using the techniques described herein, multi-server distributed computing architectures may be reconfigured while mission critical applications continue to run, without disruption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system, comprising:
a plurality of physical nodes, wherein an operating system is executing collectively across the plurality of physical nodes, and wherein an application is running on the operating system;
   wherein a request is received to add a node to the plurality of physical nodes;
   wherein, at least in part in response to the request, and while the application is running, an additional node is added to the plurality of physical nodes;
   wherein at least one other node in the plurality of physical nodes is notified of the addition of the additional node; and
   wherein the at least one other node is to:
      update virtualized resources associated with the plurality of physical nodes by incorporating resources of the additional node, wherein the virtualized resources are migratable to and from the additional node;
      apply, for the application, a cost function on the updated virtualized resources based on a cost of allocating the resources from the additional node to an object associated with the application, the cost corresponding to a weighted sum of a plurality of factors associated with the updated virtualized resources; and
      in response to the cost function selecting resources of the additional node, allocate, to the application, a portion of the updated virtualized resources from the additional node.

2. The computer system of claim 1, wherein the at least one other node is further to:
   determine that the application has reached a utilization threshold of the at least one other node; and
   evaluate the distribution function based on the updated virtualized resources.

3. The computer system of claim 1, wherein the plurality of factors comprises one or more of: respective conditions of the plurality of physical nodes, an association between the object and a physical processor of the additional node, an association between the object and a virtual processor running on the additional node, and a likelihood of using a cache of the additional node.

4. The computer system of claim 1, wherein the resources from the additional node comprise a set of processor cores and a memory, and wherein the portion of the updated virtualized resources executes on a subset of the set of processor cores and a first segment of the memory.

5. The computer system of claim 4, wherein a number of virtual processors remain unchanged in the updated virtualized resources.

6. The computer system of claim 4, wherein virtual memory presented to the application excludes a second segment of the memory allocated for replication of memory pages.

7. The computer system of claim 1, wherein the at least one other node receives the notification from a hyper-kernel instance of the additional node, and wherein respective hyper-kernel instances on the plurality of physical nodes collectively execute the operating system.

8. The computer system of claim 1, wherein virtualized resources of the at least one other node are distinct from the portion of the updated virtualized resources from the additional node.

9. The computer system of claim 1, wherein the portion of the updated virtualized resources from the additional node is hot plugged to the application during the execution of the application.

* * * * *